United States Patent
Chen et al.

(10) Patent No.: US 10,638,167 B2
(45) Date of Patent: *Apr. 28, 2020

(54) COMPRESSED VIDEO BUFFERING

(71) Applicant: Avago Technologies International Sales Pte. Limited, Singapore (SG)

(72) Inventors: Xuemin Chen, Rancho Santa Fe, CA (US); Yong Li, San Diego, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 59 days.

This patent is subject to a terminal disclaimer.

(21) Appl. No.: 16/013,603

(22) Filed: Jun. 20, 2018

(65) Prior Publication Data

US 2018/0316950 A1 Nov. 1, 2018

Related U.S. Application Data

(63) Continuation of application No. 15/082,580, filed on Mar. 28, 2016, now Pat. No. 10,051,294.
(Continued)

(51) Int. Cl.
*H04N 21/235* (2011.01)
*H04N 21/234* (2011.01)
(Continued)

(52) U.S. Cl.
CPC ..... *H04N 21/23406* (2013.01); *H04N 19/152* (2014.11); *H04N 19/172* (2014.11);
(Continued)

(58) Field of Classification Search
CPC .... H04N 7/17318; H04N 7/165; H04N 7/173; H04N 21/235; H04N 21/435
See application file for complete search history.

(56) References Cited

U.S. PATENT DOCUMENTS 6,212,232 B1 * 4/2001 Reed .................... H04N 19/172
348/419.1
6,637,031 B1 10/2003 Chou
(Continued)

OTHER PUBLICATIONS

Final Office Action on U.S. Appl. No. 15/082,580 dated Oct. 20, 2017.
(Continued)

*Primary Examiner* — Annan Q Shang
(74) *Attorney, Agent, or Firm* — Foley & Lardner LLP

(57) ABSTRACT

A system controls a transmission of a sequence of compressed video data from an encoder buffer to a network for delivery to a decoder buffer. Control of the transmission includes to: determine characteristics of a video transmission path between the encoder buffer and the decoder buffer, the characteristics comprising at least one of a buffer size of the decoder buffer, an input rate of the decoder buffer, and a buffer size of an equivalent intermediary buffer of the video transmission path; determine a transmission rate from the characteristics of the video transmission path and from the sequence of compressed video data, the transmission rate being determined such that a target quality of service value can be guaranteed for the entire sequence of compressed video data transmitted at the determined transmission rate to the decoder buffer; and control transmission of the sequence of compressed video data at the determined transmission rate.

20 Claims, 9 Drawing Sheets

Related U.S. Application Data

(60) Provisional application No. 62/140,557, filed on Mar. 31, 2015.

(51) Int. Cl.
*H04N 21/2662* (2011.01)
*H04N 21/61* (2011.01)
*H04N 21/24* (2011.01)
*H04N 21/643* (2011.01)
*H04N 19/172* (2014.01)
*H04N 19/152* (2014.01)

(52) U.S. Cl.
CPC ..... *H04N 21/2401* (2013.01); *H04N 21/2408* (2013.01); *H04N 21/2662* (2013.01); *H04N 21/6125* (2013.01); *H04N 21/64322* (2013.01)

(56) References Cited

U.S. PATENT DOCUMENTS

| | | | | |
|---|---|---|---|---|
| 7,917,369 | B2* | 3/2011 | Chen | G10L 19/02 704/200.1 |
| 8,356,327 | B2 | 1/2013 | Van Beek | |
| 8,570,947 | B2* | 10/2013 | Seo | H04W 72/1284 370/328 |
| 10,051,294 | B2* | 8/2018 | Chen | H04N 21/23406 |
| 2003/0224734 | A1* | 12/2003 | Takekawa | H04L 69/04 455/72 |
| 2004/0001694 | A1* | 1/2004 | Evans | G11B 20/10527 386/344 |
| 2006/0072399 | A1* | 4/2006 | Fujimoto | G11B 27/034 369/47.1 |
| 2006/0088094 | A1* | 4/2006 | Cieplinski | H04N 21/23406 375/240.01 |
| 2006/0227743 | A1* | 10/2006 | Ishimori | H04L 1/1671 370/331 |
| 2007/0002946 | A1* | 1/2007 | Bouton | H04N 19/15 375/240.01 |
| 2008/0181256 | A1* | 7/2008 | Schwartz | H04L 47/10 370/486 |
| 2008/0253673 | A1* | 10/2008 | Nakagawa | G06F 12/0862 382/239 |
| 2009/0083431 | A1* | 3/2009 | Balachandran | G06F 15/16 709/228 |
| 2009/0190666 | A1* | 7/2009 | Viscito | H04N 21/23406 375/240.25 |
| 2010/0020689 | A1* | 1/2010 | Tang | H04L 47/10 370/235 |
| 2010/0199153 | A1* | 8/2010 | Okamura | H03M 13/118 714/781 |
| 2011/0170513 | A1* | 7/2011 | Seo | H04W 72/1252 370/329 |
| 2011/0305266 | A1* | 12/2011 | Samad | H04L 67/06 375/224 |
| 2013/0128955 | A1* | 5/2013 | Chen | H04N 21/23406 375/240.02 |
| 2013/0128958 | A1* | 5/2013 | Gamei | H04N 19/13 375/240.03 |

OTHER PUBLICATIONS

U.S. Office Action on U.S. Appl. No. 15/082,580 dated Feb. 28, 2017.

* cited by examiner

COMPRESSED VIDEO BUFFERING

CROSS-REFERENCE TO RELATED PATENT APPLICATIONS

This application is a continuation of and claims priority to and the benefit of U.S. patent application Ser. No. 15/082,580, filed Mar. 28, 2016 to Chen et al., titled "Compressed Video Buffering," which claims the benefit of and priority to U.S. Provisional Patent Application 62/140,557, filed Mar. 31, 2015 to Chen et al., titled "Compressed Video Buffering," the contents of which are incorporated herein by reference in their entirety for all purposes.

FIELD OF THE DISCLOSURE

This disclosure generally relates to compressed video, including but not limited to compressed video for Internet protocol (IP) streaming over large-scale carrier-grade video services.

BACKGROUND OF THE DISCLOSURE

IP video streaming over large-scale video services lacks a guarantee of visual quality achieved in traditional cable and satellite digital video broadcasting services.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Figure 1:
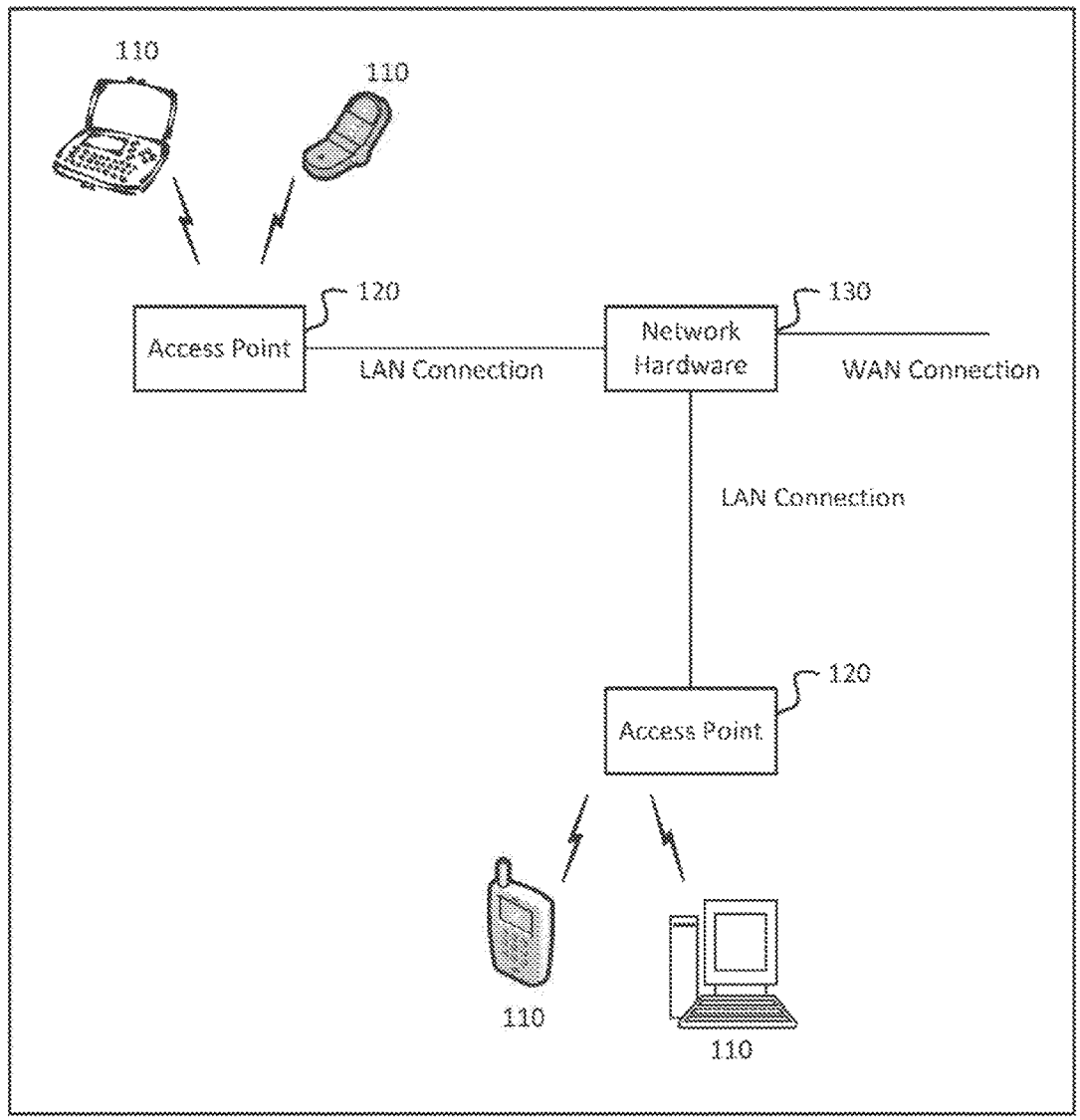
FIG. 1 is a representation of an example of a communication network.

Various embodiments are discussed in detail below. While specific implementations are discussed, it should be understood that this is done for illustration purposes only. A person skilled in the relevant art will recognize that other components and configurations can be used without parting from the spirit and scope of the present disclosure.

IP video streaming over large-scale video services lacks a guarantee of visual quality achieved in traditional cable and satellite digital video broadcasting services. Central to establishing a video-quality guarantee are compressed video buffering and timing as video frames are transmitted end-to-end from an encoder to a decoder over a distribution path in an IP network. In this disclosure, techniques for compressed video buffering are presented that address IP video traffic regulation for end-to-end video network quality of service (QoS). A set of relationships are established between decoder buffer size, network transmission rate, network delay and jitter, and video source characteristics (e.g., burstiness, data rate, and frame size). Comparisons of the techniques of this disclosure used for implementations coded with the Moving Picture Experts Group (MPEG) standard MPEG-2, Advanced Video Communications (AVC) techniques, and High Efficiency Video Coding (HEVC) standards are presented, including measurements and comparisons of the burstiness of the associated video streams. The applicability of the techniques of this disclosure to IP networks with a specific class of routers is also demonstrated.

Service providers and end users desire a visual quality of IP video delivery to match a visual quality of existing cable and satellite digital video broadcasting services (referred to herein as carrier-grade quality). Improved compressed video buffering and timing is described in the present disclosure, for improving IP video delivery to carrier-grade quality and improving QoS.

In an aspect, a system controls a transmission of a sequence of compressed video data from an encoder buffer to a network for delivery to a decoder buffer. Control of the transmission includes to: determine characteristics of a video transmission path between the encoder buffer and the decoder buffer, the characteristics comprising at least one of a buffer size of the decoder buffer, an input rate of the decoder buffer, and a buffer size of an equivalent intermediary buffer of the video transmission path; determine a transmission rate from the characteristics of the video transmission path and from the sequence of compressed video data, the transmission rate being determined such that a target quality of service value can be guaranteed for the entire sequence of compressed video data transmitted at the determined transmission rate to the decoder buffer; and control transmission of the sequence of compressed video data at the determined transmission rate.

In another aspect, a method includes determining, in a video source equipment, a transmission rate for compressed video data and transmitting the compressed video data at the determined rate from a transmitter of the video source. The determined transmission rate is sufficient to avoid underflow and overflow of a decoder buffer in a memory of a receiver of a distribution path, where the distribution path is between the encoder buffer and the decoder buffer. Determining the transmission rate includes identifying a combined amount of compressed video data of an encoder buffer of the video source equipment, the total amount including a first amount of compressed video data presently in the encoder buffer and a second amount of compressed video data to be provided to the encoder buffer, and identifying a third amount of compressed video data presently in at least one intermediary buffer in the distribution path. Determining the transmission rate further includes calculating an expected amount of data to be received at the decoder buffer over a time interval, ensuring that the combined amount of compressed video data plus the third amount of compressed video data is greater than or equal to the expected amount of data to be received at the decoder buffer, and ensuring that the expected amount of data to be received at the decoder buffer minus the first amount of compressed video data presently in the encoder buffer and minus the third amount of compressed video data presently in the at least one intermediary buffer is less than or equal to a maximum size of the decoder buffer.

In another aspect, an apparatus includes at least one memory including a video encoder data buffer, transmitter circuitry to provide data from the encoder data buffer to a distribution path and directed to a receiver in the distribution path, and processor circuitry. The processor circuitry determines a transmission rate for compressed video data to be transmitted by the transmitter, the transmission rate determined to ensure that a decoder buffer of the receiver will not underflow or overflow during transmission of a defined length video sequence to the receiver. The processor circuitry provides the determined transmission rate to network nodes in the distribution path for quality of service provisioning. The processor circuitry controls the transmitter circuitry to transmit the video sequence at the determined transmission rate.

Prior to discussing specific embodiments of the present solution, it may be helpful to describe aspects of the operating environment as well as associated system components (e.g., hardware elements) in connection with the methods and systems described herein. In the following discussions, a wired network may be based on any available wired network standard, including but not limited to Ethernet, Universal Serial Bus (USB), and IEEE 1394 (Firewire™); and a wireless network may be based on any available wireless network standard, including but not limited to WiFi (802.11a, 802.11b, 802.11g, 802.11n, 802.11ac, etc.), Bluetooth, ZigBee, CDMA, GSM, Long Term Evolution (LTE), LTE Advanced, High-Speed Packet Access (HSPA) or Evolved HSPA (HSPA+), Wideband CDMA (WCDMA), Enhanced Voice-Data Optimized (EVDO), Worldwide Interoperability for Microwave Access (WiMAX), General Packet Radio Service (GPRS), and Enhanced Data Rates for GSM Evolution (EDGE).

FIG. 1 illustrates an example of a network environment. In one or more embodiments, the network environment is an ad hoc network environment, an infrastructure wireless network environment, or a subnet environment. In brief overview, the network environment includes in one or embodiments a wireless communication system that includes one or more devices 110, one or more access points 120, and a network hardware 130.

In one or more embodiments, one or more devices 110 and access points 120 are, or are included as part of, a computing device. In one or more embodiments, a computing device includes a plurality of network interfaces, such as one or more wired interfaces for connecting to a wired network and one or more wireless interfaces for connecting to a wireless network. In one or more embodiments, a computing device uses these interfaces separately (e.g., connecting via WiFi when available and a cellular communication standard when WiFi is unavailable).

Examples of devices 110 include without limitation laptop computers, tablets, personal computers and/or cellular telephone devices. Computing devices are described more generally below with reference to FIGS. 2B and 2C.

Devices 110 are illustrated in FIG. 1 as communicating with access points 120 wirelessly; however, in one or more embodiments, one or more devices 110 communicate with respective access point(s) 120 via wired connection(s).

Access point 120 allows one or more devices 110 to connect to a network through access point 120. For example, in one or more embodiments, access point 120 connects to a wired Ethernet connection and provides wireless connections using radio frequency links for wireless devices 110 to access the wired connection through access point 120.

In one or more embodiments, access point 120 is configured, designed and/or built for operating in a wireless local area network (WLAN). In one or more embodiments, access point 120 connects to a router (e.g., via a wired network), and in one or more embodiments, access point 120 is a component of a router. In one or more embodiments, access points 120 supports a standard for sending and receiving data using one or more radio frequencies. In one or more embodiments, one or more access points 120 support public Internet hotspots, or an internal network to extend the network's Wi-Fi signal range.

In one or more embodiments, access points 120 are used in wireless networks (e.g., based on a radio frequency network protocol). Correspondingly, in one or more embodiments, one or more devices 110 include a built-in radio or a coupling to a radio. In one or more embodiments, devices 110 have the ability to function as a client node seeking access to resources (e.g., data, and connection to networked nodes such as servers) via one or more access points 120.

In one or more embodiments, access points 120 may be operably coupled to network hardware 130 via local area network connections. Examples of network hardware 130 include without limitation a router, gateway, switch, bridge, modem, system controller, and appliance. In one or more embodiments, network hardware 130 provides a local area network connection. In one or embodiments, an access point 120 has an associated antenna or an antenna array to communicate with devices 110 which are wireless. Such wireless devices 110 may register with a particular access point 120 to receive services (e.g., via a SU-MIMO or MU-MIMO configuration). In some embodiments, devices 110 communicate directly via an allocated channel and communications protocol (e.g., point-to-point communications). In one or more embodiments, one or more wireless devices 110 are mobile with respect to corresponding access point(s) 120; in one or more embodiments, one or more wireless devices 110 are relatively static with respect to corresponding access point(s) 120.

Examples of network connections include without limitation a point-to-point network, a broadcast network, a telecommunications network, a data communication network, and a computer network. Examples of network topology include without limitation a bus, star, or ring network topology. In some embodiments, different types of data may be transmitted via different protocols. In other embodiments, the same types of data may be transmitted via different protocols.

Figure 2A:
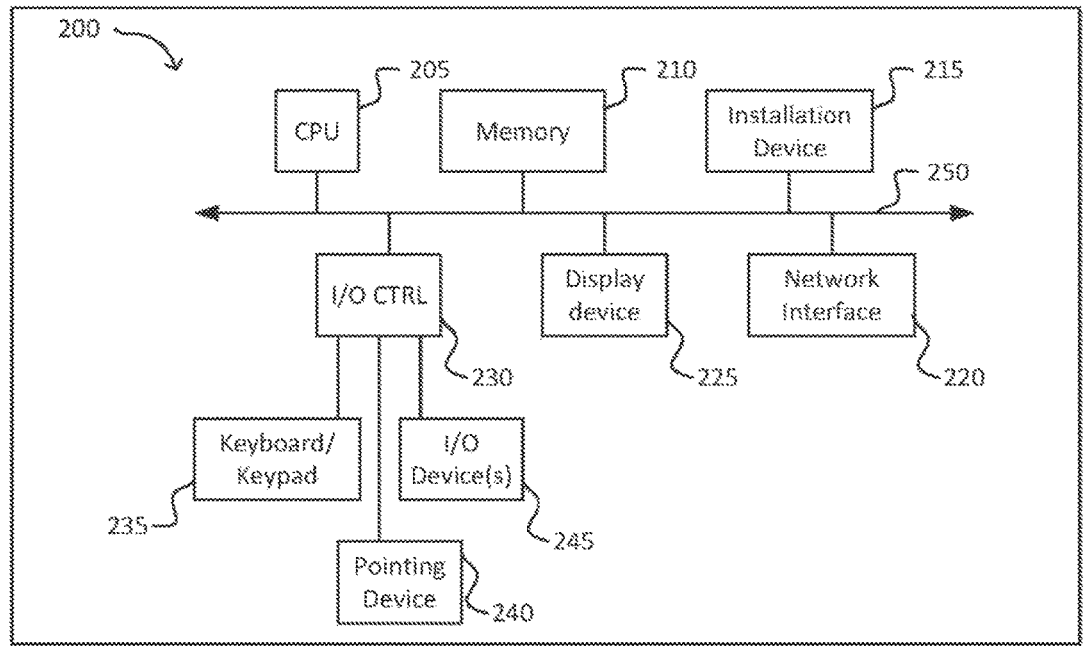
FIG. 2A is a block diagram of an example of a computing device.
Figure 2B:
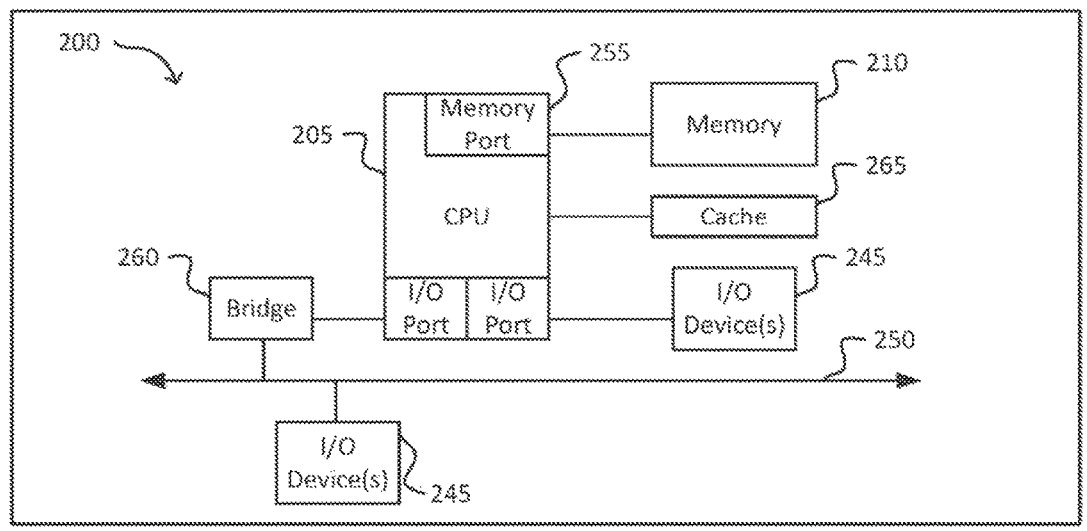
FIG. 2B is a block diagram of an example of a computing device.

FIGS. 2A and 2B depict block diagrams of a computing device 200. As shown in FIG. 2A, computing device 200 includes a central processing unit (CPU) 205 and memory 210. As also shown in FIG. 2A, in one or more embodiments, a computing device 200 includes one or more of an installation device 215, a network interface 220, a display device 225, an input/output (I/O) controller 230, a keyboard (or keypad) 235, a pointing device 240 such as a mouse, and, more generally, I/O devices 245. Components of computing device 200 communicate with each other over one or more buses 250. Memory 210 includes, for example, data, an operating system, and application software. As shown in FIG. 2B, computing device 200 includes additional optional elements in one or more embodiments, such as a memory port 255, a bridge 260, and a cache memory 265 in communication with CPU 205.

CPU 205 represents processing functionality implemented in one or more of a processor, microprocessor, microcontroller, ASIC, and/or FPGA, along with associated logic. More generally, CPU 205 is any logic circuitry that responds to and processes instructions fetched from memory 210. Examples of CPU 205 include processors manufactured by Intel Corporation of Mountain View, Calif.; International Business Machines of White Plains, N.Y.; or Advanced Micro Devices of Sunnyvale, Calif.

Memory 210 represents one or more memory devices capable of storing data and/or storing instructions (e.g., operating system and application software). Portions of memory 210 are accessed by CPU 205 through a bus, or through a direct memory access (DMA) device or function. Memory 210 includes semiconductor memories such as random access memory (RAM, e.g., static RAM (SRAM), dynamic RAM (DRAM), and ferroelectric RAM (FRAM), among others), or other semiconductor devices (e.g., NAND flash, NOR flash, and solid state drives (SSD), among others). In the embodiment shown in FIG. 2A, CPU 205 communicates with memory 210 via shared bus 250. FIG. 2B depicts an embodiment of a computing device 200 in which CPU 205 communicates with memory 210 via a dedicated bus of memory port 255. In one or more embodiments, CPU 205 communicates with one or more memory 210 over a combination of dedicated and shared buses, such as a dedicated bus for instruction access, and a shared bus for data access. In one or more embodiments, one or more memory 210 is dual ported.

In the embodiment shown in FIG. 2B, CPU 205 communicates directly with cache memory 265 via a dedicated bus. In one or more embodiments, CPU 205 communicates with cache memory 265 using shared bus 250.

In the embodiment shown in FIG. 2B, CPU 205 communicates with various I/O devices 245 via shared bus 250, or through a dedicated I/O bus via an I/O port. Examples of I/O buses include a VESA VL bus, an ISA bus, an EISA bus, a MicroChannel Architecture (MCA) bus, a PCI bus, a PCI-X bus, a PCI-Express bus, or a NuBus. In one or more embodiments in which an I/O device 245 is a display device, CPU 205 uses an Advanced Graphics Port (AGP) to communicate with the display device 225.

I/O devices 245 include input devices such as keyboards, mice, trackpads, trackballs, microphones, dials, touch pads, touch screen, and drawing tablets, and output devices such as video displays and speakers. The I/O devices in one or more embodiments are controlled by an I/O controller 230 as shown in FIG. 2A. An I/O device provides storage and/or an installation medium for computing device 200 in one or more embodiments. In one or more embodiments, computing device 200 provides USB connections (not shown) to receive handheld USB storage devices such as the USB Flash Drive line of devices manufactured by Twintech Industry, Inc. of Los Alamitos, Calif.

Referring again to FIG. 2A, in one or more embodiments, computing device 200 supports a suitable installation device 215, such as a disk drive, a CD-ROM drive, a CD-R/RW drive, a DVD-ROM drive, a flash memory drive, a USB device, a hard-drive, a network interface, or any other device suitable for installing software and programs. Optionally, an installation device 215 is also a storage device. Additionally, the operating system and the software is run from a bootable medium in one or more embodiments.

Computing device 200 in one or more embodiments includes a network interface 220 providing one or more connections such as LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections are established using associated protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax and direct asynchronous connections). In one or more embodiments, computing device 200 communicates with other computing devices via a gateway or tunneling protocol such as Secure Socket Layer (SSL) or Transport Layer Security (TLS). Network interface 220 in one or more embodiments includes a built-in network adapter, network interface card, PCMCIA network card, card bus network adapter, wireless network adapter, USB network adapter, modem or other device suitable for interfacing computing device 200 to a network capable of communication and performing the operations described herein.

In one or more embodiments, computing device 200 includes or is connected to one or more display devices 225. As such, any of I/O devices 245 and/or I/O controller 230 includes suitable hardware, software, or combination of hardware and software to support, enable or provide for the connection and use of display device(s) 225 by computing device 200. For example, in one or more embodiments, computing device 200 includes a video adapter, video card, driver, and/or library to interface, communicate, connect or otherwise use display device(s) 225. In one or more embodiments, a video adapter includes multiple connectors to interface to display device(s) 225. In one or more embodiments, computing device 200 includes multiple video adapters, with each video adapter connected to display device(s) 225. In one or more embodiments, computing device 200 communicates with multiple displays 225. One ordinarily skilled in the art will recognize and appreciate the various ways and embodiments that a computing device 200 connects to, includes, and/or controls one or more display devices 225.

In one or more embodiments, bridge 260 provides a connection between the shared bus 250 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a FibreChannel bus, a Serial Attached small computer system interface bus, a USB connection, or a HDMI bus.

A computing device 200 of the sort depicted in FIGS. 2A and 2B operates under the control of an operating system in one or more embodiments, which controls scheduling of tasks and access to system resources. Examples of operating systems include versions of the MICROSOFT WINDOWS operating systems, the different releases of the Unix and Linux operating systems, versions of the MAC OS for Macintosh computers, an embedded operating system, a real-time operating system, an open source operating system, a proprietary operating system, an operating systems for mobile computing devices, or other operating system capable of executing on computing device 200 and performing the operations described herein. Typical operating systems include, but are not limited to: Android, produced by Google Inc.; WINDOWS 7 and 8, produced by Microsoft Corporation of Redmond, Wash.; MAC OS, produced by Apple Computer of Cupertino, Calif.; WebOS, produced by Research In Motion (RIM); OS/2, produced by International Business Machines of Armonk, N.Y.; and Linux, a freely-available operating system distributed by Caldera Corp. of Salt Lake City, Utah, or any type and/or form of a Unix operating system, among others.

A computing device 200 is, for example, a workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. Computing device 200 has sufficient processor power and memory capacity to perform the operations described herein. Aspects of the operating environments and components described above will become apparent in the context of the systems and methods disclosed herein.

Figure 3:
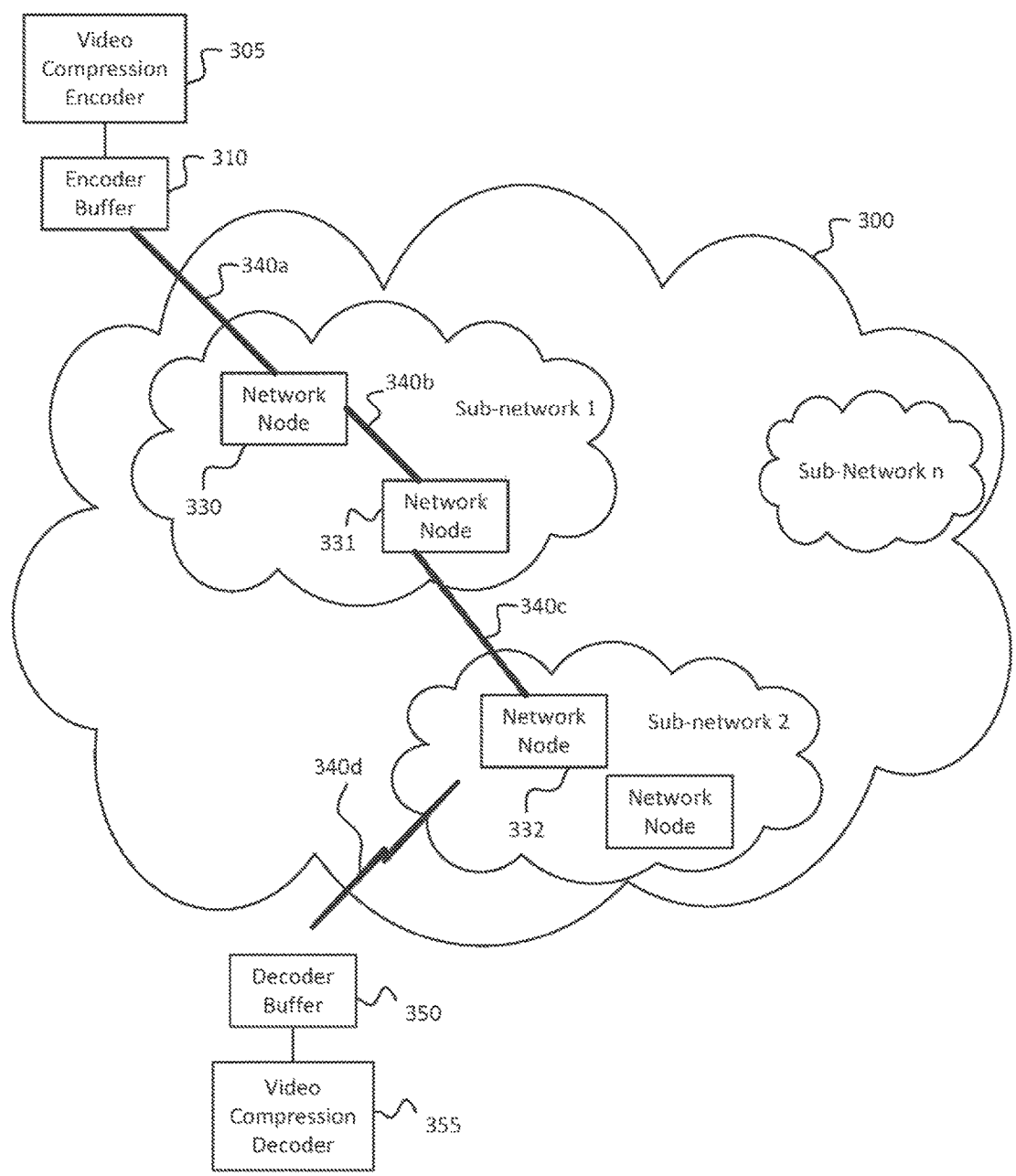
FIG. 3 is a representation of an example of video broadcasting network.

FIG. 3 illustrates a network 300 through which video may be sent between network nodes. As illustrated in FIG. 3, in one or more embodiments, network 300 includes sub-networks such as Sub-network 1, Sub-network 2 through Sub-network n. Sub-networks include one or more network nodes. For example, Sub-network 1 is illustrated as including network nodes 330 and 331, and Sub-network 2 is illustrated as including network node 332 along with another network node. In FIG. 3, a video path 340 through network 300 is shown, including path portions 340a, 340b, 340c, and 340d and network nodes 330, 331, 332. In one or more embodiments, portions of network 300 may be wired and portions may be wireless, as seen, for example, by the illustration of wired connections for path portions 340a, 340b, 340c and a wireless connection for path portion 340d. It should be understood that other wired/wireless connection combinations are within the scope of the present disclosure.

In the embodiment of FIG. 3, video is compressed at a source video compression encoder 305 and compressed video data is buffered in an encoder buffer 310. The compressed video data is provided from encoder buffer 310 to path portion 340a of video path 340, and is received via path portion 340d of video path 340 by a decoder buffer 350. A receiver video compression decoder 355 extracts the compressed video data from decoder buffer 350 and decodes the compressed video data for display.

In some video compression standards (e.g., MPEG-2, AVC, and HEVC), a hypothetical reference decoder (HRD) or video buffer verifier (VBV) model (referred to herein as a buffering model) is specified for modeling the transmission of compressed video data from encoder 305 to decoder 355. The buffering model generally imposes constraints on variations in bit rate over time in a compressed bit stream with respect to timing and buffering. Such a buffering model has been used in the past for carrier-grade video transmission (e.g., digital video broadcasting via cable and satellite).

Figure 4A:
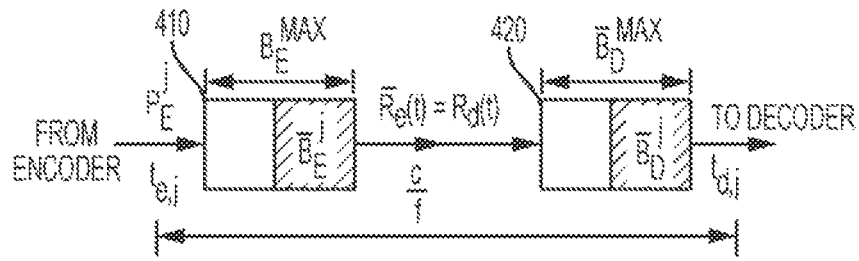
FIG. 4A is a representation of a video encoder and decoder buffer model.

FIG. 4A illustrates an example of a buffering model for carrier-grade compressed digital video transmission over a distribution path (e.g., video path 340) from an encoder buffer 410 to a decoder buffer 420. Consider a digital video with a frame time $t \in T = \{T_0, T_1, \ldots T_{N-1}\}$ with $$T_{i+1} = T_i + \frac{1}{f}$$

where f is the frame rate (e.g., 30 frames per second). The term frame as used herein refers to a single picture in a video sequence for ease of discussion. However, it should be understood to be within the scope of the present disclosure that a frame may include less than a single picture of the video sequence, or more than a single picture of the video sequence. For delivering carrier-grade compressed digital video, a video buffer manager at a source provides a mechanism to prevent decoder buffer under- and/or overflow. In the buffering model of FIG. 4A, a video encoder generates a sequence of compressed frames and places these frames into an encoder buffer 410. The sequence of compressed frames is transmitted to a receiver and placed into a decoder buffer 420. Encoder buffer 410 and decoder buffer 420 are characterized by the following set of parameters (where buffer sizes and frame sizes are in bits, timings in seconds, data rates in bits per second, and video frame rate in frames per second unless otherwise specified).

$B_E^{MAX}$: An encoder buffer 410 size.

$P_E^j$: A size of a j-th compressed frame.

$\overline{B}_E^j$: An encoder buffer 410 level right before the j-th compressed frame is inserted into encoder buffer 410, and $P_E^j + \overline{B}_E^j \leq B_E^{MAX}$ $R_e^{MAX}$: A maximum encoder buffer 410 output data rate.

$\overline{R}_e(t)$: An encoder buffer 410 output data rate function, and $\overline{R}_e(t) \leq R_e^{MAX}$.

$R_d(t)$: A decoder buffer 420 input data rate function, and $R_d(t) = \overline{R}_e(t)$.

$\overline{B}_D^{MAX}$: A decoder buffer 420 size.

$\overline{B}_D^j$: A decoder buffer 420 level right before the j-th compressed frame is inserted into decoder buffer 420, and $\overline{B}_D^j \leq \overline{B}_D^{MAX}$ $t_{e,j}$: An encoding time of the j-th frame which is the time right before the j-th compressed frame is inserted into encoder buffer 410, and $t_{e,j} \in T$.

$t_{d,j}$: A decoding time of the j-th frame which is the time right before the j-th compressed frame is removed from decoder buffer 420, and $t_{d,j} \in T$.

Assuming that the video delivery system preserves the original video frame rate (neither inserting nor dropping frames), then the encoding and decoding times satisfy equations 1 and 2.

$$t_{e,j+1} - t_{e,j} = \frac{1}{f}, \forall j \quad (1)$$

$$t_{d,j+1} - t_{d,j} = \frac{1}{f}, \forall j \quad (2)$$

There are a combined number 'c' of compressed frames in encoder buffer 410 and decoder buffer 420 at the time $t_{e,j}$ ($\overline{B}_E^j + \overline{B}_D^j$ are data of c consecutive compressed frames). Without loss of generality, assume $c \geq 1$ is an integer. (Note that if c is not an integer, [c] is used instead, where [·] denotes a ceiling function). In an ideal case of no network delay, the time between encoding and decoding is as in equation 3 where $c \geq 1$ is a constant.

$$t_{d,j} - t_{e,j} = \frac{c}{f}, \forall j \quad (3)$$

Equation 3 indicates that after a frame is (instantaneously in the ideal case) placed into the encoder buffer, it will take $$\frac{c}{f}$$

seconds before it is (instantaneously in the ideal case) removed from the decoder buffer. In this case, equation 4 applies.

$$\overline{B}_D^{MAX} \triangleq \frac{c}{f} \cdot R_e^{MAX} \qquad (4)$$

Equations 1-4 relate to carrier-grade video distribution. The techniques of the present disclosure address buffer dynamics in a generalized IP video distribution (which encompasses carrier-grade video distribution). Parameters are determined to avoid underflow and overflow of decoder buffer 350 in the more general case of network 300 (FIG. 3).

Figure 4B:
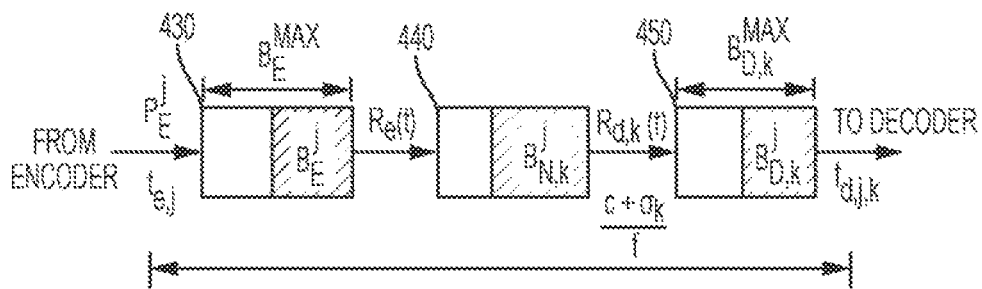
FIG. 4B is a block diagram of a video transmission path model.

FIG. 4B illustrates a generalized network model with parameters related to generalized IP video distribution. Consider an IP video delivery system where a compressed video stream is transmitted sequentially, frame-by-frame, from a source encoder 305 through distribution paths (including video path 340) to one or more decoders (e.g., decoder 355) in the network 300. Assume for simplicity that network buffers along each distribution path (e.g., buffers in network nodes 330, 331, 332 of video path 340) are represented by an aggregate network buffer 440 (FIG. 4B) for that distribution path. Characteristics of a k-th distribution path (e.g., video path 340 in FIG. 3) include the following parameters.

$B_E^j$: An encoder buffer 430 level right before a j-th compressed frame is inserted into encoder buffer 430. Note that this can be the same as $\overline{B}_E^j$ of encoder buffer 410 (FIG. 4A) in the buffer model for carrier-grade digital video broadcasting (i.e., $B_E^j = \overline{B}_E^j$).

$B_{N,k}^j$: A total aggregate network buffer 440 level of the k-th distribution path right before the j-th compressed frame is inserted into encoder buffer 430.

$B_{D,k}^{MAX}$: A decoder buffer 450 size for the k-th distribution path.

$B_{D,k}^j$: A decoder buffer 450 level for the k-th distribution path right before the j-th compressed frame is inserted into encoder buffer 430, and $B_{D,k}^j \le B_{D,k}^{MAX}$.

$t_{d,j,k}$: A decoding time of the j-th frame for the k-th distribution path, which is the time right before the j-th compressed frame is removed from decoder buffer 450, and $t_{d,j,k} \in T$.

$R_e(t)$: An encoder buffer 430 output data rate function.

$R_{d,k}(t)$: A decoder buffer 450 input data rate function of the k-th distribution path for the video transmission.

Now, assume that the end-to-end IP video data transmission has no loss and is in first-in-first-out (FIFO) order in both encoder buffer 430 and decoder buffer 450, and that compressed frames are transmitted as individual impulses. With these two assumptions, an end-to-end k-th distribution path from the encoder to the decoder as shown in FIG. 4B corresponds to equation 5; and equation 6 is equation 5 rewritten to omit the inequality by incorporating a delay term $$\frac{\sigma_k}{f}.$$

$$t_{d,j,k} - t_{e,j} \ge \frac{c}{f}, \forall j \qquad (5)$$

$$t_{d,j,k} - t_{e,j} = \frac{c + \sigma_k}{f}, \forall j \qquad (6)$$

In equations 5 and 6, j is the compressed-frame index, $\sigma_k \ge 0$ is a constant, and $$\frac{\sigma_k}{f}$$

is a network buffer delay for the k-th distribution path (e.g., video path 340). Without loss of generality, assume $\sigma_k$ is an integer for the k-th distribution path. Note that if $\sigma_k$ is not an integer, $\lceil \sigma_k \rceil$ is used instead.

To obtain correct frame timing for video coding and transmission, Theorem 1 and Theorem 2 are posited, with associated proofs.

Theorem 1: For the video transmission system described in FIG. 4B, decoder buffer 450 for the k-th distribution path will not underflow if and only if $$P_E^j + B_E^j + B_{N,k}^j \le \int_{t_{e,j}}^{t_{d,j,k}} R_{d,k}(t) dt, \forall j \qquad (7)$$

Proof: To avoid decoder buffer 450 underflow, for all j, the compressed data in encoder buffer 430 and aggregate network buffers 440 up to and including frame j (i.e., $P_E^j + B_E^j + B_{N,k}^j$) should be completely transmitted to decoder buffer 450 before the required decoding time $t_{d,j,k}$. Therefore, inequality (7) follows. However, if there exists j such that $P_E^j + B_E^j + B_{N,k}^j > \int_{t_{e,j}}^{t_{d,j,k}} R_{d,k}(t) dt$, then the data of $P_E^j$ will not have completely arrived at decoder buffer 450 since the data transmission is in FIFO order; that is, decoder buffer 450 will underflow. (End of proof.)

Theorem 2: For the video transmission system described in FIG. 4B, decoder buffer 450 for the k-th distribution path will not overflow if and only if $$\int_{t_{e,j}}^{t_{d,j,k}} R_{d,k}(t) dt - (B_E^j + B_{N,k}^j) \le B_{D,k}^{MAX}, \forall j \qquad (8)$$

Proof: To avoid decoder buffer 450 overflow, for all j, a decoder buffer 450 fullness at time $t_{d,j,k}$ (right before the j-th compressed frame is removed from decoder buffer 450) should be less than or equal to $B_{D,k}^{MAX}$. From the time $t_{e,j}$ to $t_{d,j,k}$, a number of bits arriving at decoder buffer 450 will be $\int_{t_{e,j}}^{t_{d,j,k}} R_{d,k}(t) dt$, and a number of bits being removed from decoder buffer 450 will be all the compressed video data before the j-th frame in encoder buffer 430, network buffer 440, and decoder buffer 450 at time $t_{e,j}$ (i.e., $B_E^j + B_{N,k}^j + B_{D,k}^j$). Thus decoder buffer 450 fullness at time $t_{d,j,k}$ satisfies equation 9.

$$(\int_{t_{e,j}}^{t_{d,j,k}} R_{d,k}(t) dt + B_{D,k}^j) - (B_E^j + B_{N,k}^j + B_{D,k}^j) \le B_{D,k}^{MAX} \qquad (9)$$

Inequality (8) follows. However, if there exists such that $\int_{t_{e,j}}^{t_{d,j,k}} R_{d,k}(t) dt - (B_E^j + B_{N,k}^j) > B_{D,k}^{MAX}$, then some data in will be lost before it is removed from decoder buffer 450 for decoding (decoder buffer 450 will overflow), because the data transmission is in FIFO order. (End of proof.)

Keeping Theorem 1 and Theorem 2 in mind, note that there are $c + \sigma_k$ compressed frames in encoder buffer 430, aggregate network buffer 440, and decoder buffer 450 at the time $t_{e,j}$ (i.e., $B_E^j + B_{N,k}^j + B_{D,k}^j$ are data of $c + \sigma_k$ consecutive compressed frames). Thus, equation 10 applies.

$$B_{D,k}^{MAX} \triangleq \frac{c + \sigma_k}{f} \cdot R_e^{MAX} \quad (10)$$

As can be seen, decoder buffer 450 size is a network-delay dependent parameter.

Figure 4C:
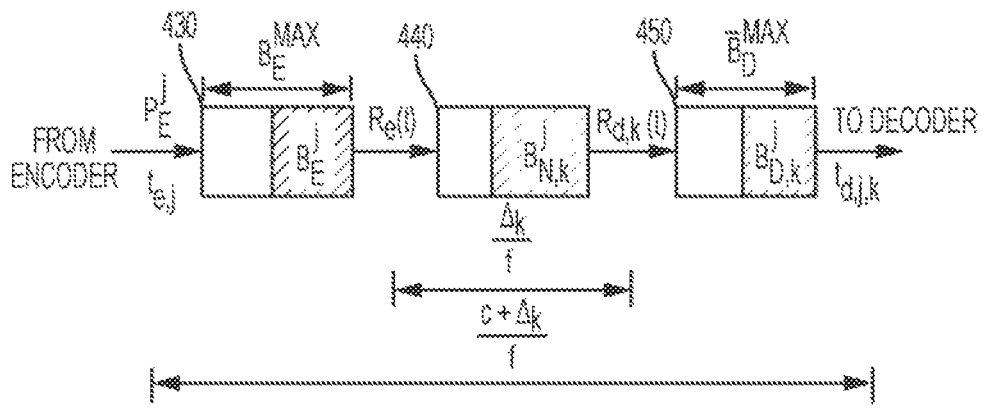
FIG. 4C is a block diagram of a video transmission path model with a fixed delay.

FIG. 4C illustrates a constant-delay network model. The model of FIG. 4C is similar to the model of FIG. 4B, a difference being that a delay between the output of encoder buffer 430 and the input of decoder buffer 450 is a constant, or fixed, delay $$\frac{\Delta_k}{f}.$$

In such a fixed-delay network, the following simplified conditions on video buffer dynamics are obtained, where decoder buffer 450 size is independent of the network delay. Without loss of generality, assume that network delay parameter $\Delta_k$ is an integer. (If it is not, $[\Delta_k]$ is used instead.) Corollary 1 is posited, with associated proof.

Corollary 1: If the network link for the k-th distribution path has a fixed delay $$\frac{\Delta_k}{f}$$

between the output of encoder buffer 430 and the input of decoder buffer 450 at t∈T for all j, then a) Decoder buffer 450 will not underflow if and only if $$P_E^j + B_E^j \leq \int_{t_{e,j}+\frac{\Delta_k}{f}}^{t_{d,j,k}} R_{d,k}(t)dt, \forall j \quad (11)$$

b) Decoder buffer 450 will not overflow if and only if $$\int_{t_{e,j}+\frac{\Delta_k}{f}}^{t_{d,j,k}} R_{d,k}(t)dt - B_E^j \leq \overline{B}_D^{MAX}, \forall j \quad (12)$$

where decoder buffer 450 size $\overline{B}_D^{MAX}$ is given in equation 4.

Proof: If the network link for the k-th distribution path has a fixed delay $$\frac{\Delta_k}{f}$$

between the output of encoder buffer 430 and the input of decoder buffer 450 at t∈T for all j, then the aggregate network buffer 440 always contains all video data ready to enter decoder buffer 450 in the next $$\frac{\Delta_k}{f}$$

time interval. Thus, equation 13 describes the aggregate network buffer 440.

$$B_{N,k}^j = \int_{t_{e,j}}^{t_{e,j}+\frac{\Delta_k}{f}} R_{d,k}(t)dt, \forall j \quad (13)$$

It can be seen from Theorem 1 and equation 13 that a condition for preventing decoder buffer 450 underflow is $$P_E^j + B_E^j + B_{N,k}^j = P_E^j + B_E^j + \int_{t_{e,j}}^{t_{e,j}+\frac{\Delta_k}{f}} R_{d,k}(t)dt \leq \int_{t_{e,j}}^{t_{d,j,k}} R_{d,k}(t)dt, \forall j$$

or, written otherwise is $$P_E^j + B_E^j \leq \int_{t_{e,j}+\frac{\Delta_k}{f}}^{t_{d,j,k}} R_{d,k}(t)dt, \forall j.$$

It can be also seen from Theorem 2, FIG. 4C and equation 13 that a condition for preventing decoder buffer 450 overflow is $$\int_{t_{e,j}}^{t_{d,j,k}} R_{d,k}(t)dt - (B_E^j + B_{N,k}^j) =$$

$$\left( \int_{t_{e,j}}^{t_{d,j,k}} R_{d,k}(t)dt - \int_{t_{e,j}}^{t_{e,j}+\frac{\Delta_k}{f}} R_{d,k}(t)dt \right) - B_E^j, =$$

$$\int_{t_{e,j}+\frac{\Delta_k}{f}}^{t_{d,j,k}} R_{d,k}(t)dt - B_E^j \leq \frac{c}{f} \cdot R_e^{MAX} = \overline{B}_D^{MAX}, \forall j.$$

(End of proof.)

Corollary 1 provides a set of conditions on video bit rate, frame rate, encoding/decoding time, video buffers, and network delay for the model of FIG. 4C. These conditions ensure correct video timing for end-to-end video transmission. This system is applicable to live digital video broadcasting services (e.g., present cable and satellite live pay-TV broadcasting services). If $\Delta_k=0$, the conditions provided by inequalities (11) and (12) for preventing decoder buffer 450 underflow and overflow are the same as those for the system model shown in FIG. 4A.

Figure 4D:
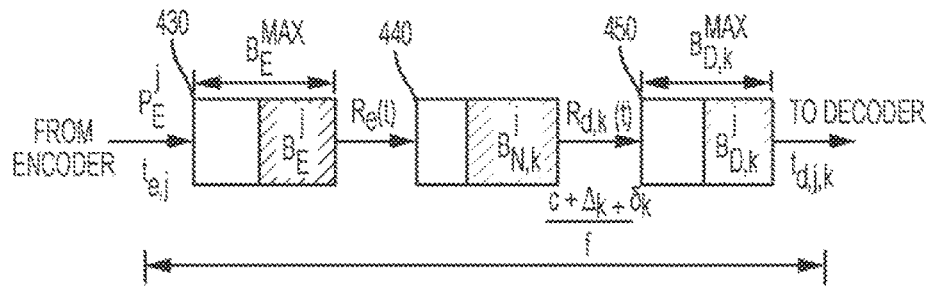
FIG. 4D is a block diagram of a video transmission path model with a fixed delay and a jitter.

FIG. 4D illustrates a network model including a jitter parameter. Corollary 1 provides that, for a constant-delay distribution path k as shown in FIG. 4C, the actual decoder buffer 450 size is independent of the network-delay parameter $\Delta_k$. However, for a k-th distribution path with a jitter parameter $\delta_k \geq 0$ (i.e., the network delay varies between $$\frac{\Delta_k}{f} \text{ and } \frac{\Delta_k + \delta_k}{f}),$$

the system model is modified as shown in FIG. 4D. Without loss of generality, assume $\delta_k$ is an integer. (If $\delta_k$ is not an integer, $[\delta_k]$ is used instead). Corollary 2 is posited, with associated proof.

Corollary 2: If the k-th distribution path between the output of encoder buffer 430 and the input of decoder buffer 450 has a fixed delay $$\frac{\Delta_k}{f}$$

with a maximum jitter $$\frac{\delta_k}{f}$$

at t∈T for all j then
a) Decoder buffer 450 will not underflow if $$P_E^j + B_E^j \le \int_{t_{e,j}+\frac{\Delta_k+\delta_k}{f}}^{t_{d,j,k}} R_{d,k}(t)dt, \; \forall\, j. \qquad (14)$$

b) Decoder buffer 450 will not overflow if $$\int_{t_{e,j}+\frac{\Delta_k}{f}}^{t_{d,j,k}} R_{d,k}(t)dt - B_E^j \le \overline{B}_D^{MAX}(\delta_k), \; \forall\, j, \qquad (15)$$

where decoder buffer 450 size is $$\overline{B}_D^{MAX}(\delta_k) = \frac{c+\delta_k}{f} \cdot R_e^{MAX}. \qquad (16)$$

Proof: If the k-th distribution path between the output of encoder buffer 430 and the input of decoder buffer 450 has a fixed delay $$\frac{\Delta_k}{f}$$

with a maximum jitter $$\frac{\delta_k}{f}$$

at t∈T for all j, then the aggregate network buffer 440 fullness $B_{N,k}^j$ will be bounded as shown in equation 17.

$$\int_{t_{e,j}}^{t_{e,j}+\frac{\Delta_k}{f}} R_{d,k}(t)dt \le B_{N,k}^j \le \int_{t_{e,j}}^{t_{e,j}+\frac{\Delta_k+\delta_k}{f}} R_{d,k}(t)dt. \qquad (17)$$

In other words, the aggregate network buffer 440 contains at least all video data ready for entering decoder buffer 450 in the next $$\frac{\Delta_k}{f}$$

time interval, but no more than the video data ready for entering decoder buffer 450 in the next $$\frac{\Delta_k+\delta_k}{f}$$

time interval. If the following inequality holds $$P_E^j + B_E^j + B_{N,k}^j \le P_E^j + B_E^j + \int_{t_{e,j}}^{t_{e,j}+\frac{\Delta_k+\delta_k}{f}} R_{d,k}(t)dt \le \int_{t_{e,j}}^{t_{d,j,k}} R_{d,k}(t)dt, \; \forall\, j$$

or, rewritten as $$P_E^j + B_E^j \le \int_{t_{e,j}+\frac{\Delta_k+\delta_k}{f}}^{t_{d,j,k}} R_{d,k}(t)dt, \; \forall\, j,$$

it can be seen from Theorem 1 and equation 17 that this is a sufficient condition for preventing decoder buffer 450 underflow. It can be also seen from FIG. 5 that $$t_{d,j,k} - \left(t_{e,j} + \frac{\Delta_k}{f}\right) = \frac{c+\delta_k}{f}.$$

Therefore, it follows from Theorem 2 and equations 16 and 17 that a sufficient condition for preventing decoder buffer 450 overflow is $$\int_{t_{e,j}}^{t_{d,j,k}} R_{d,k}(t)dt - (B_E^j + B_{N,k}^j) \le \left(\int_{t_{e,j}}^{t_{d,j,k}} R_{d,k}(t)dt - \int_{t_{e,j}}^{t_{e,j}+\frac{\Delta_k}{f}} R_{d,k}(t)dt\right) - B_E^j,$$

$$= \int_{t_{e,j}+\frac{\Delta_k}{f}}^{t_{d,j,k}} R_{d,k}(t)dt - B_E^j$$

$$\le \frac{c+\delta_k}{f} \cdot R_e^{MAX} = \overline{B}_D^{MAX}(\delta_k), \; \forall\, j.$$

(End of proof.)

Corollary 2 provides a set of sufficient conditions on video buffer dynamics for the system model given in FIG. 4D to ensure correct video timing for end-to-end video transmission. This system model is applicable to end-to-end IP video transmission systems (e.g., live IP pay-TV services for generic IP video clients).

Figure 5:
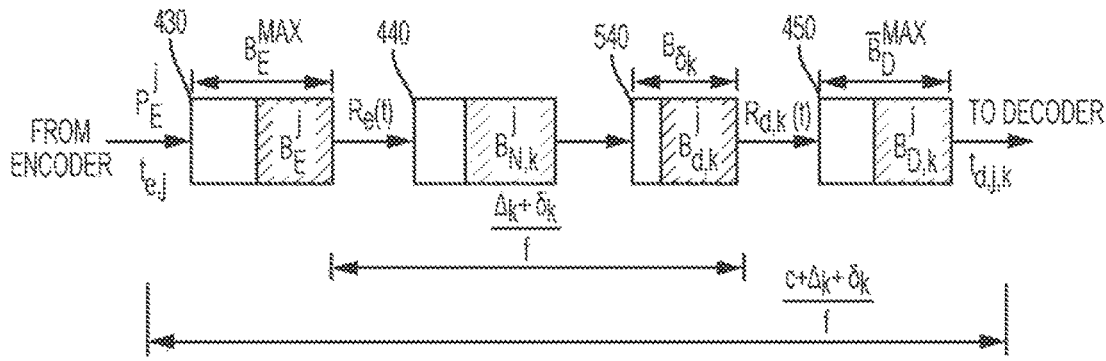
FIG. 5 is a block diagram of a video transmission path model with a dejitter buffer.

FIG. 5 illustrates a variation of the video transmission system model of FIG. 4D. FIG. 5 includes a dejitter buffer 540

$$\left(\text{size } B_{\delta_k} = \frac{\delta_k}{f} \cdot R_e^{MAX}\right)$$

before decoder buffer 450

$$\left(\text{size } \overline{B}_D^{MAX} = \frac{c}{f} \cdot R_e^{MAX}\right).$$

Video data transmitted from the input of the aggregate network buffer 440 to the output of the dejitter buffer 540 has a fixed delay $$\frac{\Delta_k + \delta_k}{f}.$$

Corollary 3 is posited, with associated proof.

Figure 6:
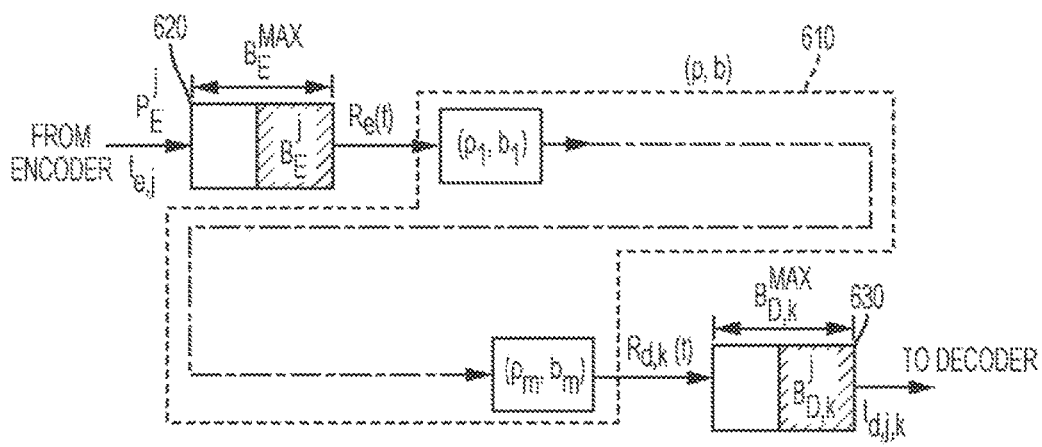
FIG. 6 is a block diagram of a video transmission path model with regulators.

Corollary 3: For the k-th distribution path with a fixed delay $$\frac{\Delta_k}{f}$$

and a maximum jitter $$\frac{\delta_k}{f}$$

at t∈T for all j, if a dejitter buffer 540 shown in FIG. 6 is used before decoder buffer 450, then a) Decoder buffer 450 will not underflow if and only if $$P_E^j + B_E^j \le \int_{t_{e,j}+\frac{\Delta_k+\delta_k}{f}}^{t_{d,j,k}} R_{d,k}(t)dt, \ \forall \ j. \quad (18)$$

b) Decoder buffer 450 will not overflow if and only if $$\int_{t_{e,j}+\frac{\Delta_k+\delta_k}{f}}^{t_{d,j,k}} R_{d,k}(t)dt - B_E^j \le \overline{B}_D^{MAX}, \ \forall \ j. \quad (19)$$

Proof: From equation 17:

$$B_{N,k}^j \le \int_{t_{e,j}}^{t_{e,j}+\frac{\Delta_k+\delta_k}{f}} R_{d,k}(t)dt.$$

If the video data transmitted from the input of the aggregate network buffer 440 to the output of the dejitter buffer 540 has a fixed delay $$\frac{\Delta_k + \delta_k}{f}$$

at t∈T for all j, then the aggregate network buffer 440 and the dejitter buffer 540 always contains all video data ready for entering decoder buffer 450 in the next $$\frac{\Delta_k + \delta_k}{f}$$

time interval. Thus, $$B_{N,k}^j + B_{d,k}^j = \int_{t_{e,j}}^{t_{e,j}+\frac{\Delta_k+\delta_k}{f}} R_{d,k}(t)dt, \ \forall \ j. \quad (20)$$

Similar to Theorem 1, for the system given in FIG. 5, a condition for preventing decoder buffer 450 underflow is $$P_E^j + B_E^j + B_{N,k}^j + B_{d,k}^j =$$

$$P_E^j + B_E^j + \int_{t_{e,j}}^{t_{e,j}+\frac{\Delta_k+\delta_k}{f}} R_{d,k}(t)dt \le \int_{t_{e,j}}^{t_{d,j,k}} R_{d,k}(t)dt, \ \forall \ j,$$

or, rewritten as $$P_E^j + B_E^j \le \int_{t_{e,j}+\frac{\Delta_k+\delta_k}{f}}^{t_{d,j,k}} R_{d,k}(t)dt, \ \forall \ j.$$

Also, similar to Theorem 2, for the system given in FIG. 5, a condition for preventing decoder buffer 450 overflow is $$\int_{t_{e,j}}^{t_{d,j,k}} R_{d,k}(t)dt - (B_E^j + B_{N,k}^j + B_{d,k}^j) \le \overline{B}_D^{MAX}.$$

It can be also seen from equation 20, and from the fact $$t_{d,j,k} - \frac{\Delta_k + \delta_k}{f} - t_{e,j} = \frac{c}{f},$$

that $$\int_{t_{e,j}}^{t_{d,j,k}} R_{d,k}(t)dt - (B_E^j + B_{N,k}^j + B_{d,k}^j) =$$

$$\left(\int_{t_{e,j}}^{t_{d,j,k}} R_{d,k}(t)dt - \int_{t_{e,j}}^{t_{e,j}+\frac{\Delta_k+\delta_k}{f}} R_{d,k}(t)dt\right) - B_E^j =$$

$$\int_{t_{e,j}+\frac{\Delta_k+\delta_k}{f}}^{t_{d,j,k}} R_{d,k}(t)dt - B_E^j \le \frac{c}{f}, R_e^{MAX} = \overline{B}_D^{MAX}, \ \forall \ j.$$

(End of proof.)

Corollary 3 provides a set of buffer conditions for the system model constructed in FIG. 5. This system is applicable to digital video services with a hybrid network of live broadcasting, time-shifting with digital video recording (DVR), and home IP video networking (e.g., today's cable and satellite live pay-TV services to a home gateway DVR server and then to IP video clients such as MoCA or Wi-Fi clients).

The network jitter can be compensated either in the dejitter buffer 540 as shown in FIG. 5 or in decoder buffer 450. In other words, in some embodiments, the dejitter buffer 540 function is merged with decoder buffer 450. In the case of FIG. 5, the compensation can be more efficient (e.g., the network resynchronization delay is minimal) because it can exploit timing information about the network. On the other hand, in the case of a combined dejitter buffer 540 and decoder buffer 450, the system provides more robustness against incorrect sizing of the buffers because the network jitter and processing delay can sometimes compensate each other.

Next, the buffer, rate and delay constraints of an IP video transmission system are analyzed. The linear-bounded arrival process (LBAP) model is used for this analysis. An LBAP regulated stream constrains the video traffic data produced over any time interval τ by an affine function of this time interval τ. More specifically, if $A(\tau)$ is the traffic data transmitted over the time interval τ, the traffic is said to be LBAP if there exists a pair (ρ, b) for ρ≥0 and b≥0, such that equation 21 is satisfied, where ρ represents a long-term average rate of the source and b is a maximum burst the source is allowed to transmit in any time interval of length τ.

$$A(\tau) \leq \rho\tau + b, \forall \tau > 0 \tag{21}$$

When a maximum rate $\rho_{MAX}$ of the source is known, a more useful arrival process model (ρ, b, $\rho_{MAX}$) which relates to the LBAP is:

$$A(\tau) \leq \min(\rho\tau + b, \rho_{MAX}\tau) \forall \tau > 0.$$

Operationally, the above two arrival process models can be obtained by using so-called "leaky bucket" models: LBAP maps to a single leaky bucket (ρ, b) model while maximum rate LBAP maps to a dual leaky bucket model (ρ, b, $\rho_{MAX}$). In the leaky bucket technique, a counter, called the token bucket, builds up tokens of fixed size (e.g., 1 byte each), at a constant rate of ρ in a fixed bucket of size b. This size b is often referred to as the token depth. Each time a packet is offered, the value of the counter is compared to a predetermined threshold. If the counter is below the threshold, the counter is incremented and the packet is admitted to the network. Otherwise the packet is dropped. A modified version of the leaky bucket (ρ, b) model is a (ρ, b) regulator in which, rather than dropping packets, the (ρ, b) regulator buffers the packets for later transmission. A distribution path between the encoder buffer (e.g., encoder buffer 310 or 430) and the decoder buffer (e.g., decoder buffer 350 or 450) is next described in terms of (ρ, b) regulators.

An arbitrary network of ($\rho_i$, $b_i$), i=1, 2, ..., m regulators can be analyzed by considering an equivalent single (ρ, b) regulator. Specifically, a worst-case network behavior of ($\rho_i$, $b_i$), i=1, 2, ..., m regulators can be modeled by studying the behavior of an equivalent single (ρ, b) regulator. For example, a frame rate of the equivalent single (ρ, b) regulator is equal to the first (e.g., lowest) among the allocated frame rates for the ($\rho_i$, $b_i$), i=1, 2, ..., m regulators in a serial path of transmission, and a total latency is equal to a sum of latencies of the ($\rho_i$, $b_i$), i=1, 2, ..., m regulators.

FIG. 6 illustrates an example of an equivalent single (ρ, b) regulator 610 representing ($\rho_i$, $b_i$), i=1, 2, ..., m regulators. First, burstiness of video data transmitted over (ρ, b) regulator 610 is analyzed. Consider a compressed video data output from an encoder buffer 620 being regulated by (ρ, b) regulator 610 for each frame time interval $$\left[t', t' + \frac{1}{f}\right],$$

as in equation 22.

$$\int_{t'}^{t' + \frac{1}{f}} R_e(t) dt \leq \frac{\rho}{f} + b \tag{22}$$

For the analysis, denote the following frame parameters:
$P_E^{MAX}$: The largest size of a compressed frame within a video sequence (e.g., a movie).
$P_E^{AVG}$: The average size of a compressed frame within the video sequence (e.g., a movie).
Assume that $$R_e^{MAX} \geq P_E^{MAX} \cdot f \tag{23}$$

and that the largest compressed frame $P_E^{MAX}$ of the video sequence can be transmitted within a frame time interval $$\frac{1}{f}$$

from the encoder buffer 620. Note that this assumption is for deriving a lower bound on the token depth of the (ρ, b) regulator 610. However, in practice, this is a general requirement for some video applications (e.g., video conferencing). Theorem 3 is posited, with associated proof.

Theorem 3: The token depth b of the (ρ, b) regulator 610 should satisfy:

$$b \geq P_E^{MAX} - \frac{\rho}{f}, \tag{24}$$

Proof: Because the largest compressed frame $P_E^{MAX}$ of the video sequence can be transmitted within a frame time interval $$\frac{1}{f}$$

from the encoder buffer 620, there exists an encoder output data rate $R_e(t)$ at the transmitting time t' of the largest compressed frame such that:

$$P_E^{MAX} \leq \int_{t'}^{t' + \frac{1}{f}} R_e(t) dt$$

Thus, it follows from (22) that $$P_E^{MAX} \leq \frac{\rho}{f} + b.$$

Therefore, the inequality (24) follows.
(End of proof.)
If the rate ρ is allocated to be equal to the average rate of the compressed video sequence, as shown in equation 25, $$\rho \geq \rho_{avg} \triangleq P_E^{AVG} \cdot f \tag{25}$$

then $$b \geq P_E^{MAX} - P_E^{AVG} \tag{26}$$

and the entire video sequence (e.g., a movie) can be transmitted within the (time) length of the video sequence.

Inequality (24) shows that the required token depth b can be as large as the maximum size of a compressed frame. Inequality (26) implies that the burstiness of a compressed video sequence depends not only on the largest compressed frame size, but also the average compressed frame size.

Traffic shaping is used at the network boundary to provide an average bandwidth between a sender (e.g., including encoder 305 in FIG. 3) and a receiver (e.g., including a decoder 355 in FIG. 3) while keeping the burstiness below a predetermined level.

The following analysis investigates whether increased compression ratios and decreased frame sizes (average and maximum) result in a decrease in burstiness. In the following analysis, assume that b always satisfies equation 24 and the encoder output data rate $R_e(t) \leq R_e^{MAX}$.

The metric $P_E^{MAX} - P_E^{AVG}$ is used to measure the burstiness of a video stream coded by an encoder (e.g., encoder 305, which may be a coder/decoder (codec)), and this metric is applied to compare the burstiness levels of three generations of standard video codecs, MPEG-2, AVC and HEVC. Some assumptions about the relative sizes of $P_E^{MAX}$ and $P_E^{AVG}$ for these three codecs is summarized in Table 1.

TABLE 1

| Codec | $P_E^{MAX}$ | $P_E^{AVG}$ | Burstiness Metric $(P_E^{MAX} - P_E^{AVG})$ | Burstiness-Metric Ratio |
|---|---|---|---|---|
| MPEG-2 | $\alpha \cdot P$ | $P$ | $(\alpha - 1) \cdot P$ | 1 |
| AVC | $\gamma \cdot \alpha \cdot P$ | $\beta \cdot P$ | $(\gamma \cdot \alpha - \beta) \cdot P$ | $(\gamma \cdot \alpha - \beta)/(\alpha - 1)$ |
| HEVC | $\gamma \cdot \theta \cdot \alpha \cdot P$ | $\beta \cdot \mu \cdot P$ | $(\gamma \cdot \theta \cdot \alpha - \beta \cdot \mu) \cdot P$ | $(\gamma \cdot \theta \cdot \alpha - \beta \cdot \mu)/(\alpha - 1)$ |

In the analysis, MPEG-2 is used as the baseline and compared with AVC and HEVC in terms of burstiness of coded video. For this comparison, it is assumed that, on average, A ratio of the maximum MPEG-2 frame size to the average MPEG-2 frame size is a factor $\alpha$.

A ratio of the average AVC frame size to the average MPEG-2 frame size is a factor $\beta$.

A ratio of the maximum AVC frame size to the maximum MPEG-2 frame size is a factor $\gamma$.

A ratio of the average HEVC frame size to the average AVC frame size is a factor $\mu$.

A ratio of the maximum HEVC frame size to the maximum AVC frame size is a factor $\theta$.

It was determined through simulation that, even though burstiness may be reduced (e.g., burstiness metric ratio less than 1) for some combinations of $\alpha$, $\beta$, $\gamma$, $\theta$, and $\mu$ (e.g., with $\beta = \mu = 0.5$, $\gamma = \theta = 0.6$, and a ranging between 2 and 6), the burstiness is barely decreased, and is even increased (e.g., burstiness metric ratio larger than 1) for other combinations (e.g., with $\beta = \mu = 0.5$, $\gamma = \theta = 0.9$, and $\alpha$ ranging between 2 and 6). Note that, on average, this latter combination assumes that AVC is 50% more efficient than MPEG-2 and HEVC is 50% more efficient than AVC. However, the efficiency improvement for the largest frames is 10%. Thus, with compression ratios progressively increased and frame sizes (both average and maximum) reduced across MPEG-2, AVC and to HEVC, it was determined that the worst-case video burstiness is not reduced.

Next, the service rate offered for a compressed video sequence by a network of $(\rho_i, b_i)$, $i=1, 2, \ldots, m$ regulators in the system shown in FIG. 6 is analyzed. Referring to the system given in FIG. 4B, all the compressed data in encoder buffer 430 and the aggregate network buffer 440 up to and including frame j right after the time $t_{e,j}$ is the aggregate buffer fullness $P_E^j + B_E^j + B_{N,k}^j$. If the equivalent single $(\rho^{(k)}, b)$ regulator 610 of FIG. 6 is used to model the k-th distribution path, the rate $\rho^{(k)}$ satisfies equation 27 to allow all data $P_E^j + B_E^j + B_{N,k}^j$ to be transmitted to decoder buffer 630 before the required decoding time $t_{d,j,k}$, where $\sigma_k$ is the integer given in equation 6.

$$\rho^{(k)} \geq r_k^{(j)} \triangleq \frac{f}{c + \sigma_k} \cdot (P_E^j + B_E^j + B_{N,k}^j), \forall j \quad (27)$$

Lemma 1 is posited, with associated proof.

Lemma 1: Decoder buffer 630 for the k-th distribution path will not underflow if the rate $\rho^{(k)}$ of its input equivalent $(\rho^{(k)}, b)$ regulator 610 satisfies equation 27.

Proof: It can be seen from (6) and (27) that $$P_E^j + B_E^j + B_{N,k}^j = \int_{t_{e,j}}^{t_{d,j,k}} r_k^{(j)} dt = \frac{c + \sigma_k}{f} \cdot r_k^{(j)},$$

If a fixed rate $R_{d,k}(t) = \rho^{(k)} \geq r_k^{(j)}$ for all j is allocated, then $P_E^j + B_E^j + B_{N,k}^j \leq \int_{t_{e,j}}^{t_{d,j,k}} R_{d,k}(t) dt$.

From Theorem 1, this is a sufficient condition for preventing decoder buffer 630 for the k-th distribution path to underflow.

(End of proof.)

For better network bandwidth utilization, a smaller rate $\rho^{(k)}$ is desirable. To satisfy equation 27, the allocated rate $\rho^{(k)}$ can be as small as shown in equation 28; however, equation 28 may be impractical to calculate.

$$\rho^{(k)} = \max_j (r_k^{(j)}) = \max_j \left( \frac{f}{c + \sigma_k} \cdot (P_E^j + B_E^j + B_{N,k}^j) \right) \quad (28)$$

It is known from the discussion above that, for the k-th distribution path, there are $c + \sigma_k$ compressed frames residing in encoder buffer 430, aggregate network buffer 440 and decoder buffer 450 at the time $t_{e,j}$ for all j. In other words, data $B_E^j$, $B_{N,k}^j$, and $B_{D,k}^j$ contain exactly $c + \sigma_k$ consecutive compressed frames for all j. Thus, the encoding time $t_{e,j}$ of the j-th frame is the decoding time of the $(j-(c+\sigma_k))$-th frame. Since decoder buffer 450 does not underflow at the decoding time of the $(j-(c+\sigma_k))$-th frame, $B_{N,k}^j$ should or must contain at least one frame, the $(j-(c+\sigma_k))$-th frame. Therefore, $B_E^j + B_{N,k}^j$ should or must contain at most $c + \sigma_k - 1$ frames, and $$\frac{f}{c + \sigma_k} \cdot (P_E^j + B_E^j + B_{N,k}^j) \leq \frac{f}{c + \sigma_k} \cdot \sum_{i=0}^{c+\sigma_k - 1} P_E^{j-i}, \forall j.$$

Therefore, the rate $\rho^{(k)}$ can be allocated for the k-th distribution path to be as shown in equation 29 (the allocated rate $\rho^{(k)}=r_k(c)$ is a maximum value of the average rates of a sliding window of $c+\sigma_k$ consecutive compressed frames of the video sequence).

$$\rho^{(k)} = \qquad (29)$$
$$r_k(c) \triangleq \max_j \left( \frac{f}{c+\sigma_k} \cdot \sum_{i=0}^{c+\sigma_k-1} P_E^{j-i} \right) = \frac{f}{c+\sigma_k} \cdot \max_j \left( \sum_{i=0}^{c+\sigma_k-1} P_E^{j-i} \right)$$

Note that $r_k(c)$ is not only dependent on the video sequence parameters (e.g., compressed sizes $P_E^i$ and the frame rate f), but also the network delay parameter $\sigma_k$. Lemma 2 is posited, with associated proof.

Lemma 2: For the video transmission system model given in FIG. 4B, decoder buffer 450 for the k-th distribution path will not overflow if the rate $\rho^{(k)}$ of its input equivalent ($\rho^{(k)}$, b) regulator satisfies (29).

Proof: For the rate $\rho^{(k)}$ that satisfies equation 29, $R_{d,k}(t) = \rho^{(k)}$. From equations 8, 10, 21 and 29:

$$\int_{t_{e,j}}^{t_{d,j,k}} R_{d,k}(t)dt - (B_E^j + B_{N,k}^j) = \max_j \left( \sum_{i=0}^{c+\sigma_k-1} P_E^{j-i} \right) - (B_E^j + B_{N,k}^j) \leq$$
$$(c+\sigma_k) \cdot P_E^{MAX} - (B_E^j + B_{N,k}^j) \leq \frac{c+\sigma_k}{f} \cdot R_e^{MAX} = B_{D,k}^{MAX}, \forall j.$$

From Theorem 2, this is a sufficient condition for preventing decoder buffer 450 for the k-th distribution path to overflow.
(End of proof.)

Theorem 4 follows from Lemma 1 and Lemma 2.

Theorem 4: For the video transmission system model given in FIG. 4B, decoder buffer 450 for the k-th distribution path will neither underflow nor overflow if the rate $\rho^{(k)}$ of its input equivalent ($\rho^{(k)}$, b) regulator 610 satisfies equation 29.

Note: Comparing with $\rho_{avg}$ in equation 25, the rate $\rho^{(k)}$ in equation 29 is a different result. The rate $\rho_{avg}$ implies that the entire video can be sent over the (time) length of the video. In contrast, the rate $\rho^{(k)}$ ensures that any $c+\sigma_k$ consecutive compressed frames can be transmitted over the $c+\sigma_k$ frame time interval $$\frac{c+\sigma_k}{f}.$$

For the system model given in FIG. 4D (the network link for the k-th distribution path between the output of encoder buffer 430 and the input of decoder buffer 450 has a fixed delay $$\frac{\Delta_k}{f}$$

with a maximum jitter $$\frac{\delta_k}{f}),$$

Theorem 5 is posited, with associated proof.

Theorem 5: For the video transmission system model given in FIG. 4D, decoder buffer 450 with a size $\overline{B}_D^{MAX}(\delta_k)$ given in equation 16 for the k-th distribution path will neither underflow nor overflow if the rate $\rho$ of its input equivalent ($\rho$, b) regulator satisfies $$\rho = \frac{f}{c} \cdot \max_j \left( \sum_{i=0}^{c-1} P_E^{j-i} \right).$$

Proof: From equations 6, 14, 15, 16 and 23, $$\int_{t_{e,j}+\frac{\Delta_k+\delta_k}{f}}^{t_{d,j,k}} R_{d,k}(t)dt =$$
$$\int_{t_{e,j}+\frac{\Delta_k+\delta_k}{f}}^{t_{d,j,k}} \rho dt = \max_j \left( \sum_{i=0}^{c-1} P_E^{j-i} \right) \geq \sum_{i=0}^{c-1} P_E^{j-i} \geq P_E^j + B_E^j,$$

and $$\int_{t_{e,j}+\frac{\Delta_k}{f}}^{t_{d,j,k}} R_{d,k}(t)dt - B_E^j \leq \int_{t_{e,j}+\frac{\Delta_k}{f}}^{t_{d,j,k}} \rho dt =$$
$$\frac{(\delta_k+c)}{f} \cdot \max_j \left( \sum_{i=0}^{c-1} P_E^{j-i} \right) \leq (\delta_k+c) \cdot P_E^{MAX} \leq \frac{\delta_k+c}{f} \cdot R_e^{MAX} =$$
$$\overline{B}_D^{MAX}(\delta_k), \forall j$$

Therefore, from Corollary 2, decoder buffer 450 for the k-th distribution path will neither underflow nor overflow.
(End of proof.)

Note that the rate $$\rho = \frac{f}{c} \cdot \max_j \left( \sum_{i=0}^{c-1} P_E^{j-i} \right)$$

is now only a function of the video parameters, and is independent of network delay and jitter of the k-th distribution path. However, decoder buffer 450 size is a jitter-dependent parameter for the k-th distribution path.

For the video transmission system model given in FIG. 5, Theorem 6 can be derived.

Theorem 6: For the video transmission system model given in FIG. 5, decoder buffer 450 for the k-th distribution path will neither underflow nor overflow if the rate $\rho$ of its input equivalent ($\rho$, b) regulator satisfies $$\rho = \frac{f}{c} \cdot \max_j \left( \sum_{i=0}^{c-1} P_E^{j-i} \right).$$

Proof: From equations 4, 18, 19 and 23, $$\int_{t_{e,j}+\frac{\Delta_k+\delta_k}{f}}^{t_{d,j,k}} R_{d,k}(t)dt =$$
$$\int_{t_{e,j}+\frac{\Delta_k+\delta_k}{f}}^{t_{d,j,k}} \rho dt = \max_j \left( \sum_{i=0}^{c-1} P_E^{j-i} \right) \geq \sum_{i=0}^{c-1} P_E^{j-i} \geq P_E^j + B_E^j$$

-continued and $$\int_{t_{e,j}+\frac{\Delta_k+\delta_k}{f}}^{t_{d,j,k}} R_{d,k}(t)dt - B_E^j \le \int_{t_{e,j}+\frac{\Delta_k+\delta_k}{f}}^{t_{d,j,k}} \rho \, dt =$$

$$\max_j \left( \sum_{i=0}^{c-1} P_E^{j-i} \right) \le c \cdot P_E^{MAX} \le \frac{c}{f} \cdot R_e^{MAX} = \overline{B}_D^{MAX}, \forall j$$

Therefore, from Corollary 3, decoder buffer 450 for the k-th distribution path will neither underflow nor overflow.

It can be seen that, from the perspective of decoding time and total buffer sizes, Theorem 5 is equivalent to Theorem 6. Also, the system model shown in FIG. 4C is a special case of the system model given in FIG. 5 with $\delta_k$=0. It can be verified that $$\rho = \frac{f}{c} \cdot \max_j \left( \sum_{i=0}^{c-1} P_E^{j-i} \right)$$

given in Theorem 6 also satisfies the rate conditions of Corollary 1. Thus, Corollary 4 is posited.

Corollary 4: If the network link for the k-th distribution path has a fixed delay between the output of encoder buffer 430 and the input of decoder buffer 450 at t∈T for all frames, decoder buffer 450 with a size $\overline{B}_D^{MAX}$ given in equation 4 will neither underflow nor overflow if the rate ρ of its input equivalent (ρ, b) regulator satisfies $$\rho = \frac{f}{c} \cdot \max_j \left( \sum_{i=0}^{c-1} P_E^{j-i} \right).$$

Once again, the rate $$\rho = \frac{f}{c} \cdot \max_j \left( \sum_{i=0}^{c-1} P_E^{j-i} \right)$$

is only a function of the video parameters, and is independent of network delay and jitter of the k-th distribution path. In this case, the actual decoder buffer 450 size is now independent of network jitter.

In the analysis so far, it is assumed that each compressed frame is a single integral entity (e.g., modeled as an impulse function) when it traverses the IP network. With this assumption there is no ambiguity about frame-related timings. In this section, the assumption is relaxed with respect to the practical IP networks, where each video frame is transmitted as a sequence of packets (e.g., Ethernet frames). Frame-related timings are defined for packetized video transmission, and delay and jitter bounds are established for a class of IP networks.

In practice, before the video stream is transmitted to the IP network, the frames are first packetized on the encoder side. The video packets are then transmitted over the IP network, which in general includes of a series of routers and switches. On the decoder side, the received video packets, which may be out of order during transit, are reordered and depacketized to reassemble original compressed frames before being input to the decoder buffer. (It is assumed that the packets are transmitted across the IP network error-free.)

Figure 7:
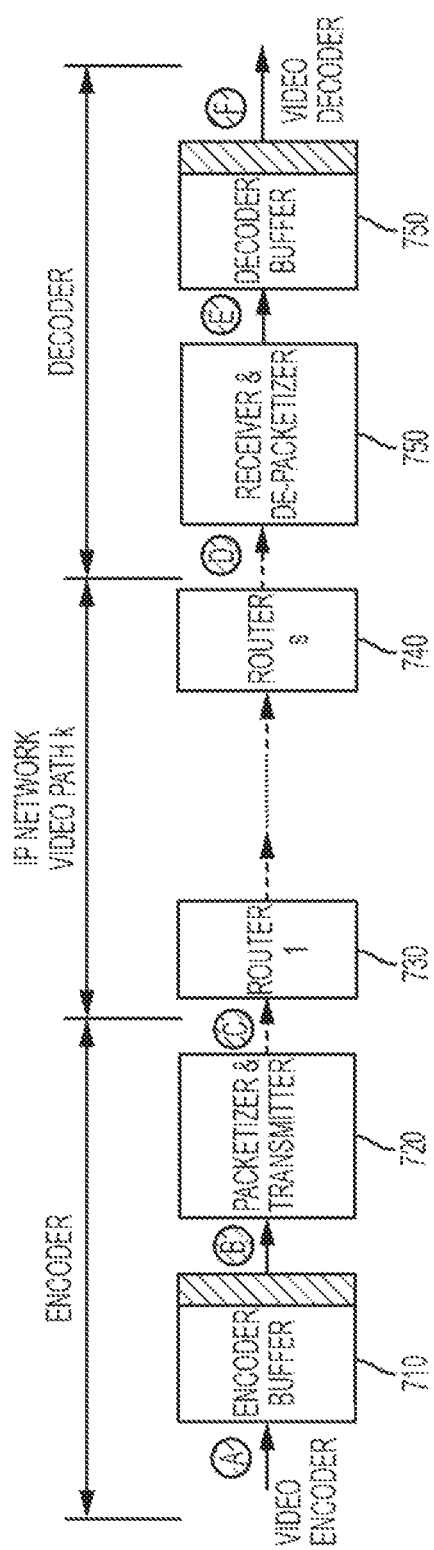
FIG. 7 is a block diagram of a video transmission path model with packetized video transmission.
Figure 8:
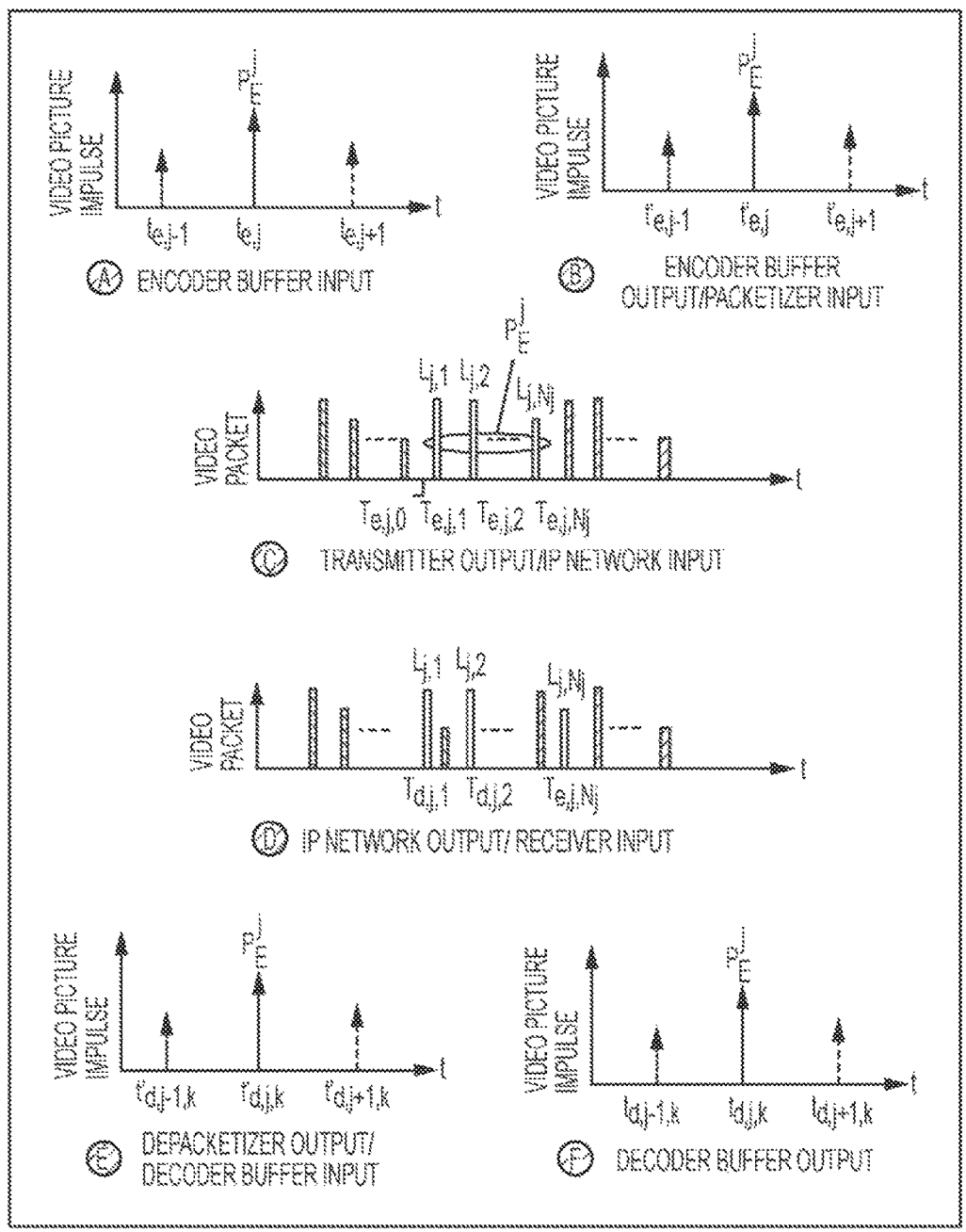
FIG. 8 illustrates an example of timing for packetized video frames.
Figure 9:
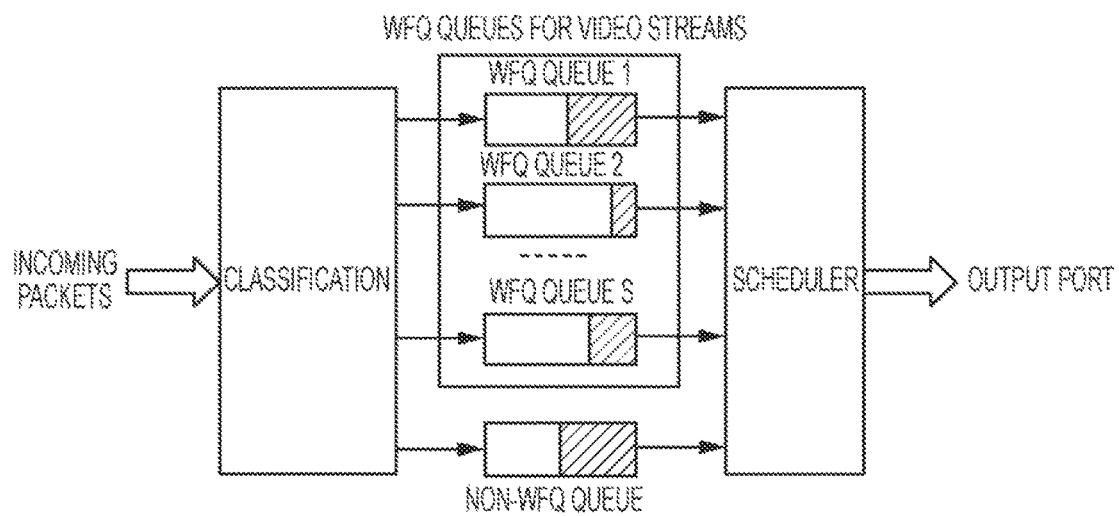
FIG. 9 is a block diagram of an IP router modeled as weighted fair queues (WFQ).

FIG. 7 represents a distribution path (e.g., video path 340 in FIG. 3). FIG. 8 illustrates video signals along the distribution path. Referring to FIG. 7, a video encoder provides compressed video data to an encoder buffer 710 at an input A of encoder buffer 710. Video data is provided from encoder buffer 710 at an input/output B to a packetizer/transmitter 720. Video data is transmitted by packetizer/transmitter 720 to a first router 730 ("Router 1") at an input/output C. The video data is transmitted through the IP network distribution path k until the video data reaches a destination router 740 ("Router s"). Router 740 provides the video data to a receiver/de-packetizer 750 at input/output D, and receiver/de-packetizer 750 provides the video data to a decoder buffer 760 at input/output E. Decoder buffer 760 then provides the video data to a video decoder at output F. FIG. 8 models the video data at input A, at input/outputs B, C, D, and E, and at output F. On the encoder side, frames are modeled as impulse functions at both the input A and input/output B of the encoder buffer 710.

A frame $P_E^j$ is packetized and transmitted to the IP network by packetizer/transmitter 720 as a sequence of $N_j$ packets of sizes $L_{j,1}$, $L_{j,2}$ . . . , $L_{j,N_j}$ at instances $T_{e,j,1}$, $T_{e,j,2}$, . . . , $T_{e,j,N_j}$, respectively, where $T_{e,j,1} \le T_{e,j,2} \le \ldots \le T_{e,j,N_j}$. An assumption is that packetizer/transmitter 720 starts the packetization of the first packet of the frame $P_E^j$ at instance $T_{e,j,0} < T_{e,j,1}$. After traversing the IP network, these packets are received on the decoder side (at receiver/de-packetizer 750 at input/output D) at instances $T_{d,j,1}$, $T_{d,h,2}$, . . . $T_{d,j,N_j}$, probably out of order. The packets are reordered and depacketized by receiver/de-packetizer 750 into the original frame $P_E^j$, which frame is pushed into decoder buffer 760 (at input/output E) before being decoded for display at $t_{d,j,k}$ (at output F).

Assume that the packetization of a video frame starts immediately after the frame is provided at input A to packetizer/transmitter 720, and that the transmission of the first packet of a video frame takes place once the packet is available to the transmitter portion of packetizer/transmitter 720. Therefore, the time at which the j-th frame is output from the encoder buffer 710, $t'_{e,j}$, coincides with the time when the first packet of the frame starts to be transmitted, $T_{e,j,0}$; that is $$t'_{e,j} = \min_{0 \le i \le N_j} \{T_{e,j,i}\} = T_{e,j,0} \quad (30)$$

Now assume that when the last packet of the frame j is received and made available at input/output D to receiver/de-packetizer 750, the reordering and depacketization of the frame will be completed immediately. Therefore, the time at which the j-th frame is provided to input/output E and thus into decoder buffer 760 coincides with the time at which the last packet of the frame is received from the IP network; that is $$t'_{d,j,k} = \max_{1 \le i \le N_j} \{T_{d,j,i}\} \quad (31)$$

Then, the end-to-end delay of the j-th frame for the k-th distribution path across the IP network can be denoted as in equation 32.

$$D_{j,k}^{e2e} \triangleq t'_{d,j,k} - t'_{em,j} \quad (32)$$

Assume that the maximum latency for any frame to go through packetizer/transmitter 720 is $T_p$; that is, $$T_p \triangleq \max_j \{T_{e,j,N_j} - T_{e,j,0}\}.$$

Then, for any j and any i with $1 \le i \le N_j$, $$T_{e,j,i} - T_{e,j,0} \le T_p \quad (33)$$

Furthermore, assume that a maximum delay for any video packet to traverse the k-th distribution path of the IP network is $D_k$; that is, $$D_k \triangleq \max_j \{\max_{1 \le i \le N_j} \{T_{d,j,i} - T_{e,j,i}\}\}.$$

Thus, for any j and any i with $1 \le i \le N_j$, $$T_{d,j,i} \le T_{e,j,i} + D_k \quad (34)$$

Lemma 3 is posited, with associated proof.

Lemma 3: The maximum end-to-end delay of video frames across a k-th distribution path of the IP network is upper-bounded as:

$$D_k^{e2e} \triangleq \max_j \{D_{j,k}^{e2e}\} \le T_p + D_k \quad (35)$$

Proof: From the definitions of $D_k^{e2e}$ equation 35 and $D_{j,k}^{e2e}$ given in equation 32, $$D_k^{e2e} = \max_j \{D_{j,k}^{e2e}\} = \max_j \{t'_{d,j,k} - t'_{e,j}\}$$

$$D_k^{e2e} = \max_j \{\sigma_{j,k}\} = \quad \text{(from (34))}$$
$$\max_j \{t'_{d,j,k} - t'_{e,j}\} = \max_j \{\max_{1 \le i \le N_j} \{T_{d,j,i}\} - T_{e,j,0}\} =$$
$$\max_j \{\max_{1 \le i \le N_j} \{T_{d,j,i} - T_{e,j,0}\}\} \le$$
$$\max_j \{\max_{1 \le i \le N_j} \{(T_{e,j,i} + D_k) - T_{e,j,0}\}\}$$

$$= \max_j \{\max_{1 \le i \le N_j} \{T_{e,j,i} + D_k - T_{e,j,0}\}\} = \quad \text{(from (33))}$$
$$\max_j \{\max_{1 \le i \le N_j} \{(T_{e,j,i} - T_{e,j,0}) + D_k\}\} \le T_p + D_k$$

(End of proof.)

This holds even for the cases where packet-reordering is performed by receiver/depacketizer 750. For the k-th distribution path, if the input video stream is (ρ, b)-regulated, a maximum delay $D_k$ incurred by a packet traversing an IP network that includes $s_k$ routers is upper-bounded by $$D_k \le \frac{b}{\rho} + \sum_{i=1}^{s_k} \Theta_{i,k} + \sum_{i=1}^{s_k} p_{i,k} \quad (36)$$

where $\Theta_{i,k}$ is the latency of the i-th router along the k-th distribution path and $\rho_{i,k}$ is the propagation delay between the i-th router and its next neighboring node along the k-th distribution path. Each router has a rate of at least ρ.

FIG. 11 illustrates a system in which each router along the video distribution path is modeled as a Weighted Fair Queuing (WFQ) system. Incoming packets are classified into corresponding queues that represent different data streams, and multiple WFQ queues and a non-WFQ queue share a bandwidth of the output port. Generally, the WFQ queues are guaranteed by the scheduler a minimum percentage (e.g., 70%) of a total output port bandwidth, and in turn the scheduler guarantees a given average data rate for each WFQ queue based on its weight. The average data rate for each WFQ queue can be dynamically configured via a QoS-negotiation protocol such as Resource Reservation Protocol (RSVP).

If the i-th router ($i < s_k$) can be modeled as a WFQ system, its latency is given by equation 37.

$$\Theta_{i,k} = \left(\frac{L_{k,max}}{\rho} + \frac{L_{max,i}}{r_i}\right) \quad (37)$$

$L_{k,max}$ is a maximum packet size of the k-th video stream (which is sent along the k-th distribution path), $L_{max,i}$ is a maximum packet size among all streams sent to the i-th router, and $r_i$ is a total bandwidth of an output port of the i-th router. For the last router (the $s_k$-th router), if it can be modeled as a WFQ system, its latency is given by equation 38.

$$\Theta_{s_k,k} = \frac{L_{max,s_k}}{r_{s_k}} \quad (38)$$

If all $s_k$ routers in FIG. 7 can be modeled as WFQ systems, from equations 36, 37 and 38, the total delay incurred by a packet of the k-th stream across this network, $D_k$, is upper-bounded as in equation 39.

$$D_k \le \frac{b}{\rho} + (s_k - 1) \times \frac{L_{k,max}}{\rho} + \sum_{i=1}^{s_k} \frac{L_{max,i}}{r_i} + \sum_{i=1}^{s_k} p_{i,k}, \quad (39)$$

Lemma 4 and Theorem 7 follow from Lemma 3 and equations 6 and 39.

Lemma 4: For an IP network with (ρ, b)-regulated video input and $s_k$ WFQ routers along the k-th distribution path, the maximum end-to-end delay of video frames across the distribution path is bounded by $$D_{j,k}^{e2e} \le T_p + D_k \le T_p + \left[\frac{b}{\rho} + (s_k - 1) \times \frac{L_{k,max}}{\rho} + \sum_{i=1}^{s_k} \frac{L_{max,i}}{r_i} + \sum_{i=1}^{s_k} p_{i,k}\right] \quad (40)$$

Theorem 7: For an IP network with (ρ, b)-regulated video input and $s_k$ WFQ routers along the k-th distribution path, the network buffer delay parameter $\sigma_k$ defined in equation 6 can be set as shown in equation 41.

$$\sigma_k = \left[f \cdot \left(T_p + \left[\frac{b}{\rho} + (s_k - 1) \times \frac{L_{k,max}}{\rho} + \sum_{i=1}^{s_k} \frac{L_{max,i}}{r_i} + \sum_{i=1}^{s_k} p_{i,k}\right]\right)\right] \quad (41)$$

The network buffer delay parameter $\sigma_k$ can be split into a fixed delay parameter $\Delta_k$ and a maximum jitter parameter $\delta_k$, for example, as shown in Corollary 5.

Corollary 5: For an IP network with (ρ, b)-regulated video input and $s_k$ WFQ routers along the k-th distribution path, the network buffer delay parameter $\sigma_k$ may be set to $\sigma_k = \Delta_k + \delta_k$ with $\Delta_k$ as shown in equation 42, where $L_{k,min}$ is the minimum packet size of the video being sent along the k-th distribution path. [·] denotes a floor function.

$$\Delta_k = \left\lfloor f \cdot \left((s_k - 1) \times \frac{L_{k,min}}{\rho} + \sum_{i=1}^{s_k} p_{i,k}\right)\right\rfloor \quad (42)$$

Additionally, a maximum jitter parameter is determined as in equation 43.

$$\delta_k = \left\lceil f \cdot \left( T_p + \frac{b}{\rho} + (s_k - 1) \times \frac{(L_{k,max} - L_{k,min})}{\rho} + \sum_{i=1}^{s_k} \frac{L_{max,i}}{r_i} \right) \right\rceil + 1. \quad (43)$$

The network buffer delay parameter $\sigma_k$ Corollary 5 is greater than or equal to the network buffer delay parameter $\sigma_k$ in Theorem 7.

As can be seen from equations 42 and 43, the fixed delay parameter $\Delta_k$ is determined by the overall minimum packet latency over the routers in the k-th distribution path and the total propagation delay, while the maximum jitter parameter $\delta_k$ determined by the latency from video stream burstiness (over the transmission rate), the latency from packetization and serialization, and the overall packet jitter over routers in the k-th distribution path caused by all streams.

Some comparison examples are provided below, where $\Delta_k$ and $\delta_k$ are calculated both for a video transmitted in terms of average rates $\rho_{avg}$ as defined in equation 25 and $\rho^*$ as set according to Theorem 5. To set the stage for the examples, some parameters are next defined.

Referring again to FIG. 7, a packetization and serialization latency $T_p$ represents a latency incurred by a video frame going through packetizer/transmitter 720, measured between the time when the video frame is made available to the packetizer/transmitter 720 (the time that the packetization of the first packet of the frame begins) and the time when the last packet of the frame is completely transmitted by packetizer/transmitter 720 to the IP network. Latency $T_p$ thus includes a latency of the packetization process as well as a latency for the serialized transmission of packets.

A video burst duration can be described by a ratio of a maximum burst size b and an average data rate $\rho$, which represents the burst duration when the video is transmitted across an IP network. From Theorem 3 and equation 26, $(P_E^{MAX} - P_E^{AVG})$ approximate the maximum burst size b. For the choice of the average data rate $\rho$, there are two options: (1) the data rate $\rho_{avg}$ defined in equation 25; and (2) the data rate $\rho^*$ that is set according to Theorem 5. The video burst duration is then calculated by $(P_E^{MAX} - P_E^{AVG})/\rho_{avg} = (P_E^{MAX} - P_E^{AVG})/(P_E^{AVG} \times f)$ and $(P_E^{MAX} - P_E^{AVG})/\rho^*$, for the two options of average data rate, respectively. Following the same technique of determining the relative sizes of maximum and average frames with respect to different codecs as in Table 1, the video burst durations for MPEG-2, AVC and HEVC are compared in Table 2, with the assumption that $\rho^* = \rho_{avg} \times \omega$, for a factor $\omega$.

For $\beta = \mu = 0.5$, $\gamma = \theta = 0.9$, and $\omega = 1.2$, burst latency is reduced for option (b) (e.g., for a ratio of maximum frame size to average frame size of $\alpha = 6$, an approximately 100 millisecond (ms) reduction in burst latency is achieved). Thus, the sliding average window of the present disclosure provides for improved QoS.

Router queuing delay is represented by $$(s_k - 1) \times \frac{L_{k,max}}{\rho_k} + \sum_{i=1}^{s_k} \frac{L_{max,i}}{r_i}$$

and depends on an average data rate of the video stream ($\rho_k$), a number of routers (i.e., hops) along the k-th distribution path ($s_k$), a maximum packet size of the k-th stream ($L_{k,max}$), a maximum packet size among all streams ($L_{max,i}$) and a total bandwidth of the output port ($r_i$) for the i-th router. A typical hop count for an Internet connection within U.S. domains is fourteen. The maximum Ethernet packet size is 1518 bytes; so both $L_{k,max}$ and $L_{max,i}$ are set to 1518 bytes. Then, with the assumptions that $\rho_k = 20$ Mbps (e.g., for 4K HEVC video) and that $r_i = 100$ Mbps, the router queuing delay is $$(s_k - 1) \times \frac{L_{k,max}}{\rho_k} + \sum_{i=1}^{s_k} \frac{L_{max,i}}{r_i} =$$
$$(14 - 1) \times \frac{1518 \times 8}{20 \times 1000} + 14 \times \frac{1518 \times 8}{100 \times 1000} = 7.9 + 1.7 \approx 10 \text{ ms.}$$

Total propagation delay depends on the distances and media types of the links connecting all routers along the distribution path. For terrestrial fiber links totaling 4800 kilometers (km) (roughly coast-to-coast continental U.S.), the total propagation delay is $4800/(300 \times 0.7) \approx 23$ ms, assuming a light speed of 300 km/ms and a velocity factor of 0.7 for optical fiber. Similarly, for MEO and GEO satellite links of 18000 km and 74000 km, the corresponding delays are 60 ms and 247 ms, respectively.

Table 3 summarizes some examples for $\Delta_k$ and $\delta_k$ various networks.

TABLE 2

| Codec | $P_E^{MAX}$ | $P_E^{AVG}$ | Option (a) Burst Duration $(P_E^{MAX} - P_E^{AVG})/(P_E^{AVG} \times f)$ | Option (b) Burst Duration $(P_E^{MAX} - P_E^{AVG})/\rho^*$ |
|---|---|---|---|---|
| MPEG-2 | $\alpha \cdot P$ | $P$ | $(\alpha - 1)/f$ | $(\alpha - 1)/(f \cdot \omega)$ |
| AVC | $\gamma \cdot \alpha \cdot P$ | $\beta \cdot P$ | $(\gamma \cdot \alpha - \beta)/(f \cdot \beta)$ | $(\gamma \cdot \alpha - \beta)/(f \cdot \beta \cdot \omega)$ |
| HEVC | $\gamma \cdot \theta \cdot \alpha \cdot P$ | $\beta \cdot \mu \cdot P$ | $(\gamma \cdot \theta \cdot \alpha - \beta \cdot \mu)/(f \cdot \beta \cdot \mu)$ | $(\gamma \cdot \theta \cdot \alpha - \beta \cdot \mu)/(f \cdot \beta \cdot \omega \cdot \mu)$ |

TABLE 3

| Link Type | Packetization and Serialization Latency $T_p$ | Burst Duration | Router Queuing Delay | Total Propagation Delay | Fixed Delay Parameter $\Delta_k$ | Max Jitter Parameter $\delta_k$ |
|---|---|---|---|---|---|---|
| Fiber links U.S. to U.S. | [0, 150] | [0, 260] | [0, 10] | 23 | 0 | 14 |
| Fiber links U.S. to China | [0, 150] | [0, 260] | [0, 10] | 55 | 1 | 14 |
| MEO Satellite | [0, 150] | [0, 260] | [0, 10] | 60 | 1 | 14 |
| GEO Satellite | [0, 150] | [0, 260] | [0, 10] | 247 | 7 | 14 |

In Table 3, it is assumed that:
f=30 fps
$T_p$=150 ms
$P_E^{MAX}$=6 M bits
$P_E^{AVG}$=0.8 M bits
ρ=20 Mbps
$s_k$=14
$L_{k,max}=L_{max,i}$=1518 bytes for all i
$L_{k,min}$=64 bytes
Terrestrial U.S.-to-U.S.: 4800 Km fiber link with velocity factor of 0.7
Terrestrial U.S.-to-China: 11500 Km fiber link with velocity factor of 0.7
MEO Satellite: 18000 Km, with terrestrial segment of the propagation delay ignored
GEO Satellite: 74000 Km, with terrestrial segment of the propagation delay ignored In the above examples, the dominating component of the fixed delay $$\left(\frac{\Delta_k}{f}\right)$$

is the total propagation delay, and the dominating components of the maximum jitter $$\left(\frac{\delta_k}{f}\right)$$

are the packetization and serialization latency and the burst duration. In comparison, the contribution of router queuing to the fixed delay and the maximum jitter is relatively very small.

So far, several models of video transmission systems have been analyzed, and theorems and corollaries proven for these models regarding the required conditions for video network transmission rates, buffer dynamics, and frame coding times. To ensure the encoder and the decoder operate properly in these models, there should also be an appropriate clock to drive the system timing. Next, system timing is discussed, with impact on video transmission over the network and derivation of various frame timing parameters, such as $t_{d,j,k}$. There are two primary approaches for providing the system timing: the encoder clock and the global clock.

The encoder clock is a time source in the encoder which serves as a master timing source for the encoder and is also used for generating slave timing sources for the network and the decoder(s). For example, in MPEG-2 systems, the 27 MHz system time clock (STC) drives the encoding and is also used as a "master clock" for the entire video transmission system. At the encoder end, the decode time stamp (DTS) and the presentation time stamp (PTS) are created from the STC and carried together with the video packets. The DTS tells the decoder when to decode the frame while the PTS tells the decoder when to display the frame.

In addition to knowing at what time decoding and presentation should occur, the STC clock samples are also embedded, to allow a time reference to be created. The program clock reference (PCR) in MPEG-2 transport stream (TS) provides 27 MHz clock recovery information. PCR is a clock recovery mechanism for MPEG programs. In MPEG-2 TS, when a video is encoded, a 27 MHz STC drives the encoding. When the program is decoded (or re-multiplexed), the decoding is driven by a clock which is locked to the encoder's STC.

The decoder uses the PCR to regenerate a local 27 MHz clock. As mentioned above, when a compressed video is inserted into the MPEG-2 TS, a 27 MHz PCR timestamp is embedded. At the decoder end, a voltage controlled oscillator (VCXO) generates a 27 MHz clock. When a PCR is received, it is compared to a local counter which is driven by the VCXO, and the difference is used to correct the frequency of the VCXO so that the 27 MHz clock is locked to the PCR. Then, decoding and presentation happen at the proper DTS and PTS times, respectively.

In this approach, all time stamps (including the clock reference) are carried with the video packets and transmitted from the encoder end to the decoder end. Thus, it is not needed to know the exact network delay to generate these time stamps since the clock is locked to the encoder clock and the actual decoding time has counted for the DTS packets network delay (e.g., $$t_{d,j,k} = \frac{\Delta_k}{f} + DTS_j$$

for the system given in FIG. 4C). For the system illustrated in FIG. 5, equation 44 applies.

$$t_{d,j,k} = \frac{\Delta_k + \delta_k}{f} + DTS_j \qquad (44)$$

The STC approach requires that the network has a constant delay at the time stamp extraction point. Therefore, this approach is clearly suitable to the video transmission systems given by FIGS. 4C and 5, but would not work correctly for the system shown in FIG. 4D.

The global clock is a global time source (e.g., synchronized "wall clock") for the encoder and the decoder. For example, both the encoder and the decoder can use a precise global clock, such as a GPS clock, to generate, compare and calculate all encoding, decoding, and presentation timing parameters, and to drive the timing circuits for the encoding and decoding systems. In this approach, the DTS and PTS are also carried with the video packets and transmitted from the encoder to the decoder. For example, $t_{d,j,k}$ given in equation 44 is also applicable for the system given in FIG. 4D (as long as the DTSs are extracted and used before the decoding time). If a global clock is available, this approach is generally applicable to all video transmission systems, including those described by the above figures and theorems.

Next is a discussion of three video service types: unicast, broadcast, and multicast.

Video unicast is a network communication where a video is sent from one sender to one receiver, such as the sending of a video packet from a single source to a specified destination. Today, unicast transmission is still the predominant form of video transmission over the Internet and on local area networks (LANs). Examples include YouTube video transmission and Netflix video service. All IP networks support the unicast transfer mode, and most users are familiar with the standard unicast applications (e.g., http, SMTP, FTP and Telnet) which employ the TCP transport protocol. All systems and theorems discussed above can be used in video unicast applications.

Video broadcast is a network communication where a video is sent from one point to all other service points. In this case there is just one source (e.g., a server), but the video is sent to all connected receivers for the service. Video broadcast examples include cable and satellite digital pay-TV broadcasting services. Today, these service examples are still the predominant forms of high-quality and carrier-grade video services to hundreds of millions of homes. Broadcast transmission is supported on most IP networks. Network layer protocols (such as IPv4) support a form of broadcast that allows the same packet to be sent to every system in a logical network (in IPv4 is the IP network ID and an all 1's host number).

In the traditional cable and satellite video broadcast services, the transmission propagation delay differences among all receivers are usually negligible. Thus, considering the system model given in FIG. 4C, the delay is the same for all distribution paths ($\Delta=\Delta_k$=constant for all k). Therefore, in this case, the decoding time for each frame is the same for receivers on all distribution paths $$\left(t_{d,j} = \frac{\Delta}{f} + DTS_j\right).$$

When video programs are streaming over an IP network, the transmission delays are different for each receiver due to network delay differences at various nodes. However, it can be seen from the example in Table 3 that, for the system models given in FIGS. 4D and 5, the decoding time $t_{d,j,k}$ differences among different distribution paths (i.e., receivers at different network nodes) may not be significant enough to cause user experience issues for some real-time video programs, such as real-time sport events.

If the service aims to achieve the same decoding time, a DTS offset would need to be added at each distribution path. In the systems given by FIGS. 4D and 5, for example, use $\overline{\Delta}=\max_k(\Delta_k+\delta_k)$ for all receivers in the service network. Also, $\overline{B}_D^{MAX}=\max_k(B_D^{MAX}(\delta_k))$ for the system given by FIG. 4D, and $B_\delta=\max_k(B_{\delta_k})$ for the system model given by FIG. 5. For the k-th distribution path, the DTS offset is $DTS_{offset}^k=\overline{\Delta}-\Delta_k-\delta_k$, Now, the decoding time $$t_{d,j} = \frac{\overline{\Delta}}{f} + DTS_j$$

is the same for receivers on all distribution paths. However, the decoder buffer fullness for the receiver on each distribution path may be different at $t_{d,j}$).

Video multicast is a network communication where a video is sent from one or more points to a different set of points. In this case there may be one or more servers, and the information is distributed to a set of receivers. The discussions herein consider a single video server. However, all results can be easily extended to more video servers.

One application example which may use multicast is a video server sending out IP networked TV channels. Simultaneous delivery of high quality video and carrier-grade service to each of a large number of delivery platforms may exhaust the capability of even a high bandwidth network with a powerful video server. This poses a salability issue for applications which need sustained high bandwidth. One way to significantly ease scaling to larger groups of clients is to employ multicast networking. Multicasting is the networking technique of delivering the same packet simultaneously to a group of clients. IP multicast provides dynamic many-to-many connectivity between a set of senders/servers (at least one) and a group of receivers. The format of IP multicast packet is identical to that of unicast packets and is distinguished only by the use of a special class of destination address (e.g., class D IPv4 address) which denotes a specific multicast group. Since TCP supports only the unicast mode, multicast applications use the UDP transport protocol.

Unlike IP broadcast transmission (which is used on some LANs), multicast video clients receive a stream of video packets only if they have previously elected to do so (by joining the specific multicast group address). Membership of a group is dynamic and controlled by the receivers (in turn informed by the local client applications). The routers in a multicast network learn which sub-networks have active clients for each multicast group and attempt to minimize the transmission of packets across parts of the network for which there are no active clients. Due to the dynamic management of the multicast transmission, the DTS offset solution for video broadcast in the earlier discussion may be not applicable here, and the decoding time $t_{d,j,k}$ will be different for each distribution path k.

The video multicast mode is useful if a group of clients require a common set of video at the same time, or when the clients are able to receive and store (cache) common video until requested (e.g., DVR). Where there is a common request for the same video by a group of clients, multicast transmission may provide significant bandwidth savings (up to $$\frac{1}{n}$$

of the bandwidth compared to n separate unicast clients).

In addition to the above modes, the techniques of the present disclosure provide for improvements in adaptive bit rate (ABR) streaming, used for streaming multimedia over a communication network such as the Internet. While in the past, video streaming technologies utilized streaming protocols such as RTP with RTSP, ABR streaming technologies are generally based on HTTP and are designed to work efficiently over large distributed HTTP networks such as the Internet. ABR streaming works by detecting a user's bandwidth and the decoder capacity in real time and adjusting the quality of a video stream accordingly. ABR uses an encoder which can encode a single source video at multiple bit rates. The player client switches between streaming the different encodings depending on available resources. More specifically, the source content is encoded at multiple bit rates, each of the different bit rate streams are segmented into small multi-second parts, and the streaming client is made aware by a manifest file of the available streams at differing bit rates. When starting, the client requests the segments from the lowest bit rate stream. If the client finds the download speed is greater than the bit rate of the segment downloaded, then the client will request the next higher bit rate segments. If the client finds the download speed for a segment is lower than the bit rate for the segment, and therefore the network throughput has deteriorated, then the client will request a lower bit rate segment. The segment time can vary depending on the particular implementation. For example, a typical segment time is two seconds.

Figure 10:
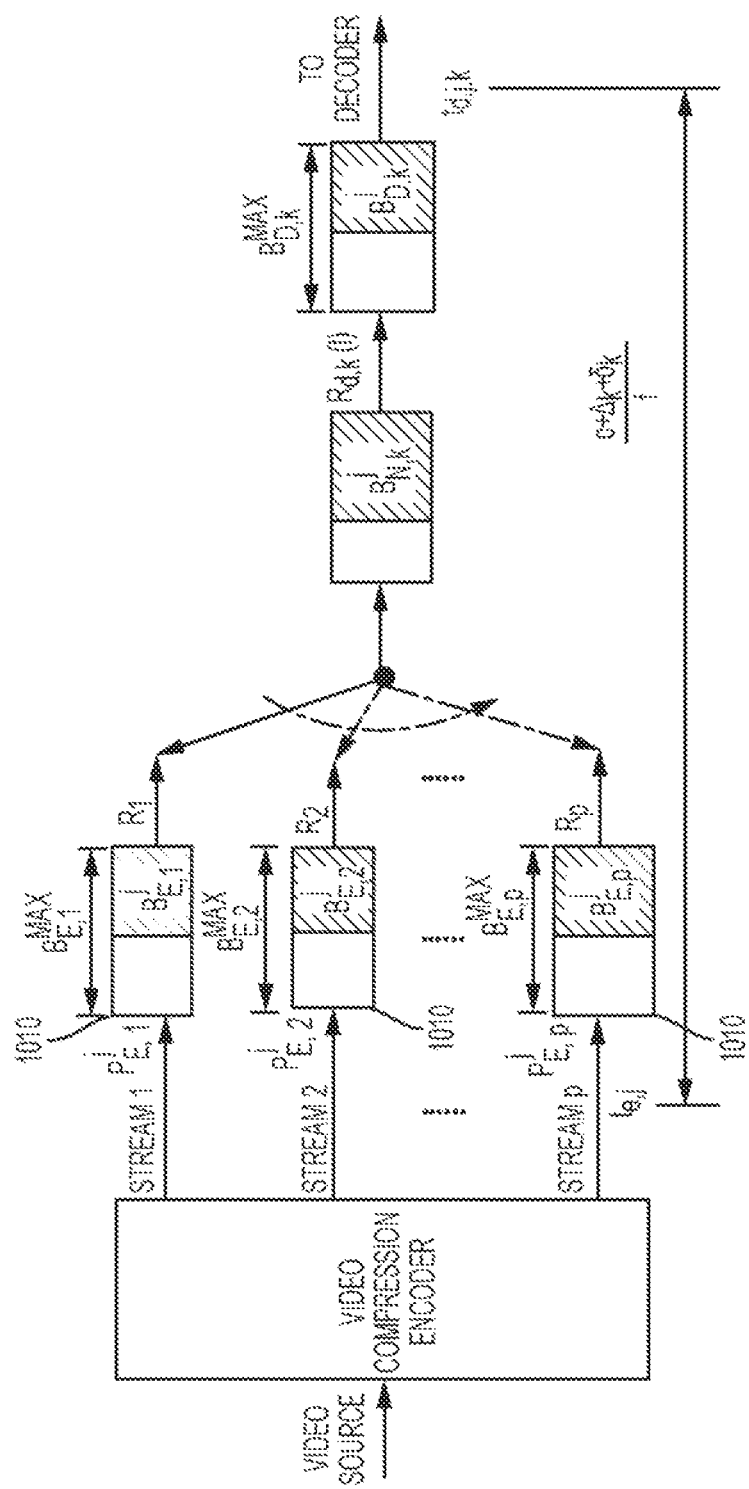
FIG. 10 is a block diagram of a video transmission path model for adaptive bit rate streaming.

FIG. 10 illustrates an example of an ABR system model. The results developed above can be applied to the transmission of each segment of video in an ABR system. Consider an ABR video encoding system as shown in FIG. 10 with p streams having output bit-rates $R_1, R_2, \ldots, R_p$. Assume that each segment of the compressed video stream is transmitted sequentially, frame-by-frame, from a video source (e.g., an encoder or video server) to multiple decoders in the network. The encoder buffers 1010 can be characterized with the following set of parameters:

$t_s$: The segment size which is the same for all p streams.
$B_{E,i}^j$: The encoder buffer level immediately before the j-th compressed frame is inserted into the encoder buffer.

Assume that the transmitted video includes segments from all p bit-rate streams and the segments from the i-th bit-rate video stream are $(\rho_i, b_i)$-regulated for i=1, 2, ... p. Corollary 5 then extends to Corollary 6.

Corollary 6: For an IP network with the $(\rho_i, b_i)$-regulated video input and $s_k$ WFQ routers along the k-th distribution path, the network buffer delay parameter $\sigma_k$ may be set to $\sigma_k = \Delta_k + \delta_{k,i}$ with $$\Delta_k = \left\lceil f \cdot \sum_{l=1}^{s_k} p_{l,k} \right\rceil \quad (44)$$

and $$\delta_{k,i} = \left\lceil f \cdot \left( T_{p,i} + \frac{b_i}{\rho_i} + (s_k - 1) \cdot \frac{L_{k,max,i}}{\rho_i} + \sum_{l=1}^{s_k} \frac{L_{max,l}}{r_l} \right) \right\rceil + 1 \quad (45)$$

and $L_{k,max,i}$ is the maximum packet size of the i-th bit-rate video being sent along the k-th distribution path.

Therefore, Theorem 8 applies to ABR systems.

Theorem 8: For a p bit-rate ABR system, if the video segments from the i-th bit-rate video stream are $(\rho_i, b_i)$-regulated for i=1,2, ... , p, and the network buffer delay parameter $\sigma_k$ for the k-th distribution path are given by Corollary 6, then the decoding time can be set to $$t_{d,j,k} - t_{e,j} = \frac{c + \Delta_k + \delta_k}{f} \quad (46)$$

where $$\delta_k = \max_i (\delta_{k,i})$$

Thus, described in this disclosure is a technique for providing compressed video buffering to support large-scale carrier-grade IP video streaming services, to address video traffic regulation for end-to-end IP network QoS. General necessary and sufficient conditions were derived for the decoder buffer to neither overflow nor underflow when a video stream traverses any end-to-end IP distribution path. These results were then utilized to develop more specific sufficient conditions for the decoder buffer to neither overflow nor underflow with respect to distribution paths of different latency characteristics. A metric to measure the burstiness of video streams was developed, and then employed to compare the burstiness of video streams coded by MPEG-2, AVC and HEVC. As a step towards applying the techniques to real-world IP networks, a class of routers that can be modelled as WFQ (Weighted Fair Queuing) systems were analyzed for their queuing latencies, and the upper bounds of video-frame delay and jitter across a network path of such routers were derived. Finally, the video system timing approaches (encoder clock and global clock) and video system types (unicast, broadcast and multicast) were discussed with respect to the developed technique of compressed video buffering.

While the disclosure has been described with reference to the specific embodiments thereof, it should be understood by those skilled in the art that various changes can be made and equivalents substituted without departing from the true spirit and scope of the disclosure as defined by the appended claims. In addition, many modifications can be made to adapt a particular situation, material, composition of matter, method, operation or operations, to the objective, spirit and scope of the disclosure. All such modifications are intended to be within the scope of the claims appended hereto. In particular, while certain methods have been described with reference to particular operations performed in a particular order, it will be understood that these operations can be combined, sub-divided, or reordered to form an equivalent method without departing from the teachings of the disclosure. Accordingly, unless specifically indicated herein, the order and grouping of the operations is not a limitation of the disclosure.

The invention claimed is:

1. A system, comprising:
   circuitry configured to:
   identify characteristics of a video transmission path between an encoder buffer and a decoder buffer, the characteristics comprising one or more sizes of one or more buffers in one or more nodes on the video transmission path;
   determine a first transmission rate for a first sequence of compressed video data of sequences of compressed video data using the characteristics of the video transmission path;
   determine a second transmission rate for a second sequence of compressed video data of the sequences of compressed video data; and
   control transmission of the sequences of compressed video data from the encoder buffer to the decoder buffer via a network using at least the first transmission rate and the second transmission rate.

2. The system of claim 1, wherein the characteristics comprises at least one of a buffer size of the decoder buffer or an input rate of the decoder buffer.

3. The system of claim 1, wherein the first transmission rate is determined such that a target quality of service value can be achieved for the first sequence of compressed video data transmitted at the determined first transmission rate to the decoder buffer.

4. The system of claim 3, wherein the target quality of service value ensures that the compressed video data in the decoder buffer will not overflow.

5. The system of claim 3, wherein the target quality of service value ensures that the compressed video data in the decoder buffer will not underflow.

6. The system of claim 1, wherein the transmission of the sequences of compressed video data is a transmission of streaming video, and the first transmission rate and the second transmission rate are independent of network delay and jitter in the video transmission path.

7. The system of claim 1, wherein the characteristics further comprise a latency of the video transmission path or a jitter of the video transmission path.

8. The system of claim 1, wherein the sequences of compressed video data are a complete sequence of compressed video data, and wherein the first transmission rate is determined at a first time for a first set of network conditions and the second transmission rate is determined at a second time for a second set of network conditions.

9. The system of claim 1, wherein the first transmission rate is a first rate for adaptive bit rate streaming and the second transmission rate is a second rate for the adaptive bit rate streaming.

10. A method, comprising:
   identifying, at a source device, a combined amount of compressed video data of an encoder buffer of the source device, the combined amount including a first amount of compressed video data presently in the encoder buffer and a second amount of compressed video data to be provided to the encoder buffer;
   identifying a third amount of compressed video data presently in at least one intermediary buffer in at least one network node on a distribution path between the encoder buffer of the source device and a decoder buffer of a receiving device, the at least one intermediary buffer is not at the source device and is not at the receiving device;
   calculating an expected amount of compressed video data to be received at the decoder buffer over a time interval;
   determining a transmission rate for compressed video data using the combined amount of compressed video data, the third amount of compressed video data, and the expected amount of compressed video data; and
   transmitting the compressed video data at the determined transmission rate from a transmitter of the source device.

11. The method of claim 10, wherein the transmission rate is determined to ensure no overflow or underflow of the decoder buffer.

12. The method of claim 11, wherein the determining the transmission rate further comprises:
   ensuring that the combined amount of compressed video data plus the third amount of compressed video data is greater than or equal to the expected amount of compressed video data to be received at the decoder buffer.

13. The method of claim 11, wherein the determining the transmission rate further comprises:
   ensuring that the expected amount of compressed video data to be received at the decoder buffer minus the first amount of compressed video data presently in the encoder buffer and minus the third amount of compressed video data presently in the at least one intermediary buffer is less than or equal to a maximum size of the decoder buffer.

14. The method of claim 10, further comprising adjusting the determined transmission rate to compensate for a network jitter in the distribution path, wherein compensating for a network jitter in the distribution path is compensating in a dejitter buffer of the source device.

15. The method of claim 10, wherein the distribution path is modeled as a $(\rho, b)$ regulator having a token depth b, wherein the token depth b is greater than or equal to a largest size of a compressed frame within a sequence to be transferred in the time interval minus a product, wherein the product is a ratio of a constant rate of filling the regulator with tokens of a fixed size multiplied by a transmission time to transmit a maximum sized frame of the sequence.

16. The method of claim 10, wherein the determining the transmission rate further comprises calculating a maximum value of a plurality of average frame transmission rates, wherein each average frame transmission rate represents a window of a defined number of consecutive compressed frames in the sequence, and the window is a sliding window over the sequence.

17. An apparatus, comprising:
   at least one memory comprising an encoder buffer;
   a transmitter configured to provide data from the encoder buffer to a distribution path for delivery to a receiver in the distribution path; and
   a processor configured to:
      determine a first transmission rate for a first sequence of compressed video data of sequences of compressed video data to be transmitted by the transmitter, the first transmission rate determined to ensure that a decoder buffer of the receiver does not underflow or overflow during transmission of the first sequence of compressed video data to the receiver;
      determine a second transmission rate for a second sequence of compressed video data of the sequences of compressed video data; and
      control the transmitter to transmit the sequences of compressed video data from the encoder buffer to the decoder buffer using at least the first transmission rate and the second transmission rate.

18. The apparatus of claim 17, wherein a decoder buffer size of the decoder buffer of the receiver is equal to a maximum output data rate of the encoder buffer multiplied by a sum of: a maximum jitter of the distribution path, and a time interval between placing a frame of the video sequence in the encoder buffer and removing the frame from the decoder buffer.

19. The apparatus of claim 18, wherein the first transmission rate is equal to a maximum of a plurality of average frame sizes divided by the time interval, wherein each average frame size is an average of frame sizes in a predefined size of window, and the window is a sliding window over the first video sequence.

20. The apparatus of claim 17, wherein the distribution path includes a number of routers, and the determining the first transmission rate includes modeling each router as a weighted fair queuing system and determining a network buffer delay parameter based on the modeling.

* * * * *